(12) United States Patent
Mathew et al.

(10) Patent No.: US 12,146,441 B1
(45) Date of Patent: Nov. 19, 2024

(54) METHODS AND APPARATUS TO MAINTAIN A STATE OF A FLUID IN A SYSTEM

(71) Applicant: General Electric Company, Schenectady, NY (US)

(72) Inventors: Paul Mathew, Bengaluru (IN); Ravindra Shankar Ganiger, Bengaluru (IN); David Raju Yamarthi, Bengaluru (IN); Rachamadugu Sivaprasad, Bengaluru (IN); Michael Joseph Murray, Wyoming, OH (US); Hiranya Kumar Nath, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/456,391

(22) Filed: Aug. 25, 2023

(30) Foreign Application Priority Data

Jul. 13, 2023 (IN) .............................. 202311047195

(51) Int. Cl.
*F02C 7/14* (2006.01)
*F02C 7/06* (2006.01)
*F02C 7/32* (2006.01)

(52) U.S. Cl.
CPC .................. *F02C 7/14* (2013.01); *F02C 7/06* (2013.01); *F02C 7/32* (2013.01)

(58) Field of Classification Search
CPC .......... F02C 7/14; F02C 7/06; F16N 2210/02; F16N 39/02; F16N 7/40
USPC ................................................. 184/6.11, 6.22
See application file for complete search history.

(56) References Cited

U.S. PATENT DOCUMENTS

| | | | | |
|---|---|---|---|---|
| 2,941,852 A | * | 6/1960 | Fuller | F16C 33/80 384/480 |
| 3,135,211 A | * | 6/1964 | Pezzillo | F04D 13/0613 417/357 |
| 4,247,155 A | * | 1/1981 | Fortmann | F16C 17/042 384/124 |
| 7,225,626 B2 | * | 6/2007 | Robinson | F16N 7/40 62/84 |
| 7,937,946 B1 | * | 5/2011 | Harris | F02C 7/224 60/39.08 |
| 8,276,359 B2 | * | 10/2012 | Bondarenko | F02C 7/14 60/39.08 |
| 8,397,506 B1 | * | 3/2013 | Wright | F02C 1/10 415/110 |
| 10,094,283 B2 | * | 10/2018 | Ertas | F01D 25/22 |
| 10,756,598 B2 | * | 8/2020 | Shaik | H02K 3/24 |
| 10,823,074 B2 | * | 11/2020 | Chalaud | F04D 27/009 |

(Continued)

*Primary Examiner* — Henry Y Liu
(74) *Attorney, Agent, or Firm* — HANLEY, FLIGHT & ZIMMERMAN, LLC

(57) ABSTRACT

Methods and apparatus to maintain a state of a fluid in a system are disclosed. An example system includes a pump including a primary inlet, a primary outlet, and a secondary inlet, at least one injector including a first inlet, a second inlet, and at least one outlet, a third conduit coupled to a first conduit upstream of the primary inlet and coupled to the at least one injector at the first inlet to deliver the fluid, a fourth conduit coupled to a second conduit downstream of the primary outlet and coupled to the at least one injector at the second inlet to deliver the fluid, and a fifth conduit coupled to the at least one injector at the at least one outlet to receive the fluid and coupled to the pump at the secondary inlet.

20 Claims, 18 Drawing Sheets

(56) References Cited

U.S. PATENT DOCUMENTS

| | | | |
|---|---|---|---|
| 11,585,222 B1* | 2/2023 | Rajendran | F01D 25/125 |
| 2004/0037696 A1* | 2/2004 | Frosini | F01D 25/18 |
| | | | 415/112 |
| 2006/0032261 A1* | 2/2006 | Robinson | F16N 39/02 |
| | | | 62/331 |
| 2010/0236213 A1* | 9/2010 | Schilling | F01D 25/14 |
| | | | 60/39.08 |
| 2013/0306265 A1* | 11/2013 | Appukuttan | F02C 7/14 |
| | | | 165/11.1 |
| 2014/0076661 A1* | 3/2014 | Xu | F16H 57/0486 |
| | | | 184/14 |
| 2014/0119881 A1* | 5/2014 | Kalra | F01D 11/04 |
| | | | 415/182.1 |
| 2014/0150439 A1* | 6/2014 | Parnin | F01D 25/20 |
| | | | 60/39.08 |
| 2015/0048617 A1* | 2/2015 | Veilleux, Jr. | F02C 7/224 |
| | | | 165/103 |
| 2016/0149451 A1* | 5/2016 | Teter | H02K 3/24 |
| | | | 310/54 |
| 2016/0164377 A1* | 6/2016 | Gauthier | H02K 1/32 |
| | | | 310/54 |
| 2017/0207683 A1* | 7/2017 | Anghel | H02P 9/00 |
| 2018/0313271 A1* | 11/2018 | Chalaud | F04D 13/14 |
| 2018/0323683 A1* | 11/2018 | Stieger | H02K 3/24 |
| 2019/0218936 A1* | 7/2019 | Fomison | F16C 33/6659 |
| 2021/0013759 A1* | 1/2021 | Torrey | H02K 3/02 |
| 2021/0143707 A1* | 5/2021 | Rico | F01K 25/103 |
| 2023/0417489 A1* | 12/2023 | Steinthorsson | F28D 1/0358 |
| 2024/0110510 A1* | 4/2024 | Minelli | F02C 7/14 |
| 2024/0110513 A1* | 4/2024 | Minelli | F01D 25/18 |
| 2024/0110514 A1* | 4/2024 | Minelli | F02C 7/16 |

\* cited by examiner

METHODS AND APPARATUS TO MAINTAIN A STATE OF A FLUID IN A SYSTEM

RELATED APPLICATION

This patent claims the benefit of Indian Provisional Patent Application No. 20/231,1047195, which was filed on Jul. 13, 2023. Indian Provisional Patent Application No. 20/231, 1047195 is hereby incorporated herein by reference in its entirety. Priority to Indian Provisional Patent Application No. 20/231,1047195 is hereby claimed.

FIELD OF THE DISCLOSURE

This disclosure relates generally to fluid systems and, more particularly, to methods and apparatus to maintain a state of a fluid in a system.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

In general, the same reference numbers will be used throughout the drawing(s) and accompanying written description to refer to the same or like parts. The figures are not necessarily to scale.

DETAILED DESCRIPTION

Figure 1:
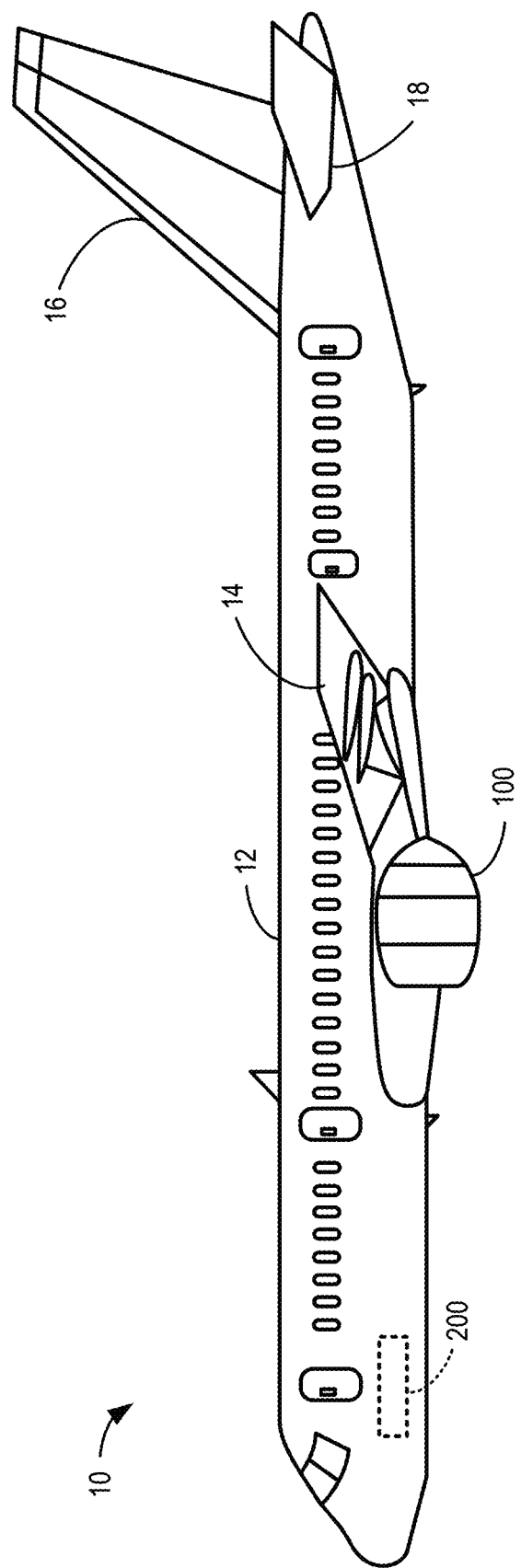
FIG. 1 is a side view of an example aircraft.

As used herein, connection references (e.g., attached, coupled, connected, fixed, joined, etc.) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher," when applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such terms may additionally, or alternatively, be understood as relative to minimum allowable speeds, pressures, or temperatures, or minimum or maximum allowable speeds, pressures, or temperatures relative to normal, desired, steady state, etc., operation of the engine.

As used herein, the terms "axial" and "axially" refer to directions and orientations that extend substantially parallel to a centerline of the turbine engine and/or a bearing assembly. Moreover, the terms "radial" and "radially" refer to directions and orientations that extend substantially perpendicular to the centerline (e.g., a rotational axis) of the turbine engine and/or the bearing assembly. In addition, as used herein, the terms "circumferential" and "circumferentially" refer to directions and orientations that extend arcuately about the centerline of the turbine engine and/or the bearing assembly.

A centrifugal fluid pump moves fluid (e.g., fuel, water, oil, supercritical carbon dioxide ($sCO_2$), etc.) through systems (e.g., waste heat recovery (WHR) systems) by converting rotational kinetic energy of an impeller to hydrodynamic energy of the flowing fluid. In other words, the angular velocity of the impeller is directly proportional to the flow rate of the flowing fluid exiting the pump. The impeller is provided with a change in rotational kinetic energy from an electric motor applying mechanical work to an impeller shaft that is coupled to the impeller and to a rotor of an electric motor. The rotor is provided with a change in mechanical work over a period of time (e.g., mechanical power) from a stator in the electric motor applying electromagnetic forces to the rotor in the form of torque. When the motor supplies a constant amount of electrical energy to the stator, then the rotor supplies a constant amount of mechanical energy to the impeller.

During operation of the pump, spinning of an impeller shaft and the associated impeller can cause the impeller shaft to radially vibrate within housing(s) of the pump. The pump housing(s) internally frames radial bearings (e.g., hydrodynamic bearings, foil bearings, rolling-element bearings, etc.) to support radial loads (e.g., weight) of the impeller shaft and dampen the vibrations.

Also, during pump operations, the impeller shaft may experience axial loads that act generally parallel to the central axis of the pump and/or impeller shaft. Axial loads acting on the impeller can be unbalanced, meaning that a forward axial load (e.g., an axial load acting toward a forward portion of the pump) and an aft axial load (e.g., axial load acting toward an aft portion of the pump) can be unequal and produce an axial thrust of the impeller shaft. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. The pump housing(s) include axial bearings (e.g., foil bearings) that support axial thrusts of the impeller shaft and reduce, inhibit, and/or dampen such movements.

In some examples, the fluid (e.g., $sCO_2$, oil, liquid helium, etc.) that the pump pressurizes in the system can be used to lubricate the radial and/or axial bearings to reduce frictional forces between a rotating element(s) within those bearings. For example, the pump can include flowlines leading from a pump outlet to the axial bearings to provide and/or transmit pressurized fluid to a thrust bearing. As used herein, a "flowline" can refer to a path (e.g., a flow path, flow direction, etc.) of the fluid and/or a structure (e.g., pipe, conduit, casing, etc.) used to enclose (e.g., direct, guide, convey, etc.) the fluid.

The pressurized fluid flows in between a thrust disc, a forward thrust pad, and an aft thrust pad of the thrust bearing apparatus, system, and/or assembly. The thrust disc is coupled to the impeller shaft and protrudes radially outward from the impeller shaft, and the thrust pads are coupled to the pump housing(s) and protrude radially inward toward the impeller shaft. Additionally, the fluid can flow between the impeller shaft and foil bearings positioned around the impeller shaft for radial support.

Furthermore, the pump can include expeller vanes to drive the fluid from internal portions of the pump housing to the pump outlet. In some examples, expeller vanes protrude from an aft side of the impeller and function similarly to impeller vanes. That is, fluid approaches the expeller vanes along the central axis and accelerates radially outward from the expeller vanes. Thus, the flowlines and the expeller vanes can implement a lubricating circuit from the pump outlet to the axial bearing(s) and back to the expeller vanes to provide a continuous flow of the fluid to the axial load bearings.

During operation of the pump, axial thrust of the impeller shaft can act in forward or aft directions based on interactions between the impeller vanes/expeller vanes and the fluid. The fluid enters through the pump inlet along a central/rotating/shaft axis toward the impeller, which includes the impeller vanes to accelerate the fluid radially outward into a pump outlet, chamber, flowline, casing, etc. Fluid pressure on a forward side, end-portion, face, etc., of the impeller can transfer aft axial loads to the impeller shaft in the aft direction. Similarly, the fluid in the pump housing flows forward along the axis of rotation of the impeller shaft and builds up pressure on an aft side, end-portion, face, etc. of the impeller (e.g., the expeller). Fluid pressure on an aft side of the impeller can transfer forward loads to the impeller shaft in the forward direction.

Unless otherwise noted, centrifugal pumps disclosed herein include at least one foil bearing (e.g., a hydrostatic gas foil bearing, a foil-air bearing, a fluid bearing, etc.) to support the axial and/or radial loads encountered by the impeller shaft and/or another rotating component in the pump, such as the impeller. Foil bearings include an inner foil lining (e.g., a top foil), a winding (e.g., a bump foil) positioned around the inner foil lining, and an outer foil lining (e.g., a bottom foil) and/or a housing positioned around the winding. During operation, the rotation of the component supported by the foil bearing produces a pressure that enables the fluid to move between the component and the foil bearing, which lifts the component. As such, the foil bearing supports the component, and the fluid provides lubrication between the foil bearing and the component.

The foil bearing(s) are intended to operate with the fluid (e.g., carbon dioxide) in a supercritical and/or gaseous form/state. As used herein, the terms "form" and "state" are used interchangeably to refer to the phase of a fluid. At startup (e.g., when the operation of the pump is intended to begin), the temperature and/or the pressure of the fluid in the pump and/or the flowline can cause the fluid to be in a liquid state, which adversely affects the performance of the foil bearing(s). For example, the liquid can result in windage loss, a film thickness/stiffness, etc. that prevents or hinders lifting of the component within (e.g., supported by) the foil bearing.

Examples disclosed herein provide a system to remove liquid from foil bearings of a pump prior to pump start-up to improve the operation of the foil bearings and, in turn, the pump. Additionally, the system controls a temperature of fluid within the pump after the pump start-up to reduce vibrations within the pump that would otherwise adversely affect the foil bearings. The temperature control after the pump-start up also prevents a motor of the pump from overheating.

In examples disclosed herein, the pump includes a primary inlet, a primary outlet, and an impeller that encounters fluid that flows through the primary inlet and drives the fluid through the primary outlet during pump operations (e.g., after pump-start up). The pump also includes an impeller shaft and a motor positioned in a chamber. Additionally, the pump includes one or more foil bearings to radially and/or axially support the impeller and/or the impeller shaft. The chamber includes at least one secondary inlet of the pump.

In some examples, the chamber includes one or more first secondary inlet(s) associated with the foil bearing(s) of the pump and one or more second secondary inlet(s) associated with a motor of the pump. That is, the first secondary inlet(s) can deliver the fluid to the foil bearing(s), and the second secondary inlet(s) can deliver the fluid to the motor. For example, a first chamber conduit(s) or flowline(s) can include an end(s) defined at the first secondary inlet(s) and can guide the fluid to an opening(s) of the foil bearing(s). Further, a second chamber conduit(s) or flowline(s) can include an end(s) defined at the second secondary inlet(s) and can guide the fluid towards windings of the motor.

The system includes a first conduit (e.g., a fluid conduit, a pipe, a tube a duct, etc.) including an end coupled to the pump at the pump inlet and a second conduit including an end coupled to the pump at the pump outlet. The system also includes one or more thermal control systems fluidly coupled to the first conduit, the second conduit, and the secondary inlet(s). More particularly, the thermal control system(s) can include feedback conduits and at least one injector. The feedback conduits can include a first end coupled to the first conduit upstream of the pump inlet and a second end coupled to the injector(s) at a first inlet of the injector(s) to deliver fluid from the first conduit to the injector(s). The feedback conduits can include a third end coupled to the second conduit downstream of the pump outlet. In some examples, the feedback conduits include a fourth end coupled to the injector(s) at a second inlet of the injector(s) to deliver fluid from the second conduit to the injector(s). In some examples, the fourth end is coupled to a portion of the feedback conduits upstream of the injector (e.g., between the first and second ends of the feedback conduits). The feedback conduits include one or more injector output ends coupled to the injector(s) at one or more outlet(s) of the injector(s) to receive fluid from the injector(s). Further, the feedback conduits include one or more pump input ends coupled to the pump at the secondary inlet(s) to deliver the fluid to the pump. In some examples, the fourth end of the feedback conduits is coupled to a portion(s) of the feedback conduits between the injector output end(s) and the pump input end(s). The feedback conduits provide the fluid to the injector(s) and provide the fluid from the injector(s) to the secondary inlet(s). The thermal control system(s) can also include one or more valves to control whether and/or how much of the fluid is delivered to the first secondary inlet(s) and/or the second secondary inlet(s).

The injector(s) control a pressure and a flow rate of the fluid. For example, the injector(s) can pressurize fluid that is in a liquid state to convert the fluid to a gaseous and/or supercritical state. More particularly, the injector(s) can build the pressure within the injector(s), in the feedback conduits, and/or in the pump. As a result, the fluid in the foil bearing(s) of the pump that is in the liquid state can be converted to the gaseous and/or supercritical state to enable the pump to begin operating without the fluid producing a windage loss, a film thickness/stiffness, etc., that would otherwise prevent or hinder lifting of the shaft supported by the foil bearing.

In some examples, the thermal control system(s) include an accumulator operatively coupled to the feedback conduits upstream of the injector(s). For example, the accumulator can be operatively coupled to the feedback conduits between the first end and the second end of the feedback conduits. The accumulator includes a liquid reservoir that contains the fluid in the liquid state. Accordingly, the injector(s) can pull the fluid in the liquid state from the accumulator. In some examples, the thermal control system(s) include a valve operatively coupled to the accumulator to control a rate at which the fluid exits the accumulator. In some examples, the thermal control system(s) include a valve operatively coupled to the feedback conduits upstream of the accumulator (e.g., between the accumulator and the first conduit) to control whether and/or a rate at which the fluid from the first conduit flows towards the injector(s). In some examples, a portion of the feedback conduits between the accumulator and the injector(s) include a mixture of the fluid from the accumulator and the fluid from the first conduit.

In some examples, the thermal control system(s) include a heater operatively coupled to the feedback conduits upstream of the injector(s) and downstream of the accumulator. For example, the heater can be operatively coupled to the feedback conduits between the accumulator and the first end of the feedback conduits. When activated, the heater can generate heat to increase a temperature and/or a pressure of the fluid in the portion of the feedback conduits between the accumulator and the injector(s).

As mentioned above, the injector(s) can be a single injector or more than one injector. For example, when the injector(s) is more than one injector, a first injector can include the first inlet and a first outlet, and a second injector can include the first inlet and a second outlet. In such examples, the feedback conduits are coupled to the first and second injectors at the first and second outlets to receive the fluid from the injectors. In some examples, the thermal control system(s) include a nozzle coupled to the first and second injectors at the first and second outlets to receive the fluid from the injectors. Accordingly, the nozzle can define a portion of the feedback conduits and/or be coupled to the feedback conduits. In such examples, the fluid from the first injector and the fluid from the second injector can mix in the nozzle. For example, the nozzle can include or define a first flowline that receives the fluid from the first injector and a second flowline that receives the fluid from the second injector.

In some examples, when the injector(s) is a single injector, the injector can include the first inlet, the second inlet, and an outlet. In some examples, when the injector(s) is a single injector, the injector includes a single inlet and a single outlet. In some examples, the thermal control system(s) include one or more valves operatively coupled to the feedback conduits to control the fluid that enters the injector. For example, a position of the valve(s) can configure whether and/or the amount of the fluid that the injector receives from the first conduit, the accumulator, and/or the second conduit. Alternatively, the thermal control system(s) can include one or more valves to control whether and/or the amount of the fluid that the injector receives from the first conduit, the accumulator, and/or the second conduit.

The system includes sensors to measure the pressure and the temperature of the fluid. For example, the sensors can measure the pressure and the temperature of the fluid in the first conduit, in the second conduit, in the feedback conduits, in the pump chamber, and/or in any other area of the system. The system also includes programmable circuitry communicatively coupled to the sensors, the valve(s), the injector (s), and/or a motor of the pump. The programmable circuitry can determine a state of the fluid based on the measurements from the sensors. For example, the programmable circuitry can determine whether and/or how much of the fluid in the system is in a liquid state. Further, when the programmable circuitry determines that an amount of the fluid in the system that is in the liquid state satisfies (e.g., is less than, is less than or equal to) a liquid threshold, the programmable circuitry can cause the pump to begin operating, such as by transmitting a control signal to the motor of the pump. The programmable circuitry can also control the heater, the injector(s), and/or the valves based on a temperature and/or a pressure of the fluid in the system, as discussed in further detail below.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include a thermal management system 200 for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the thermal management system 200 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the thermal management system 200 of FIGS. 1-3. Thus, the present subject matter can be readily adaptable to another aircraft and/or another heat transfer application associated with another type of vehicle.

Figure 2:
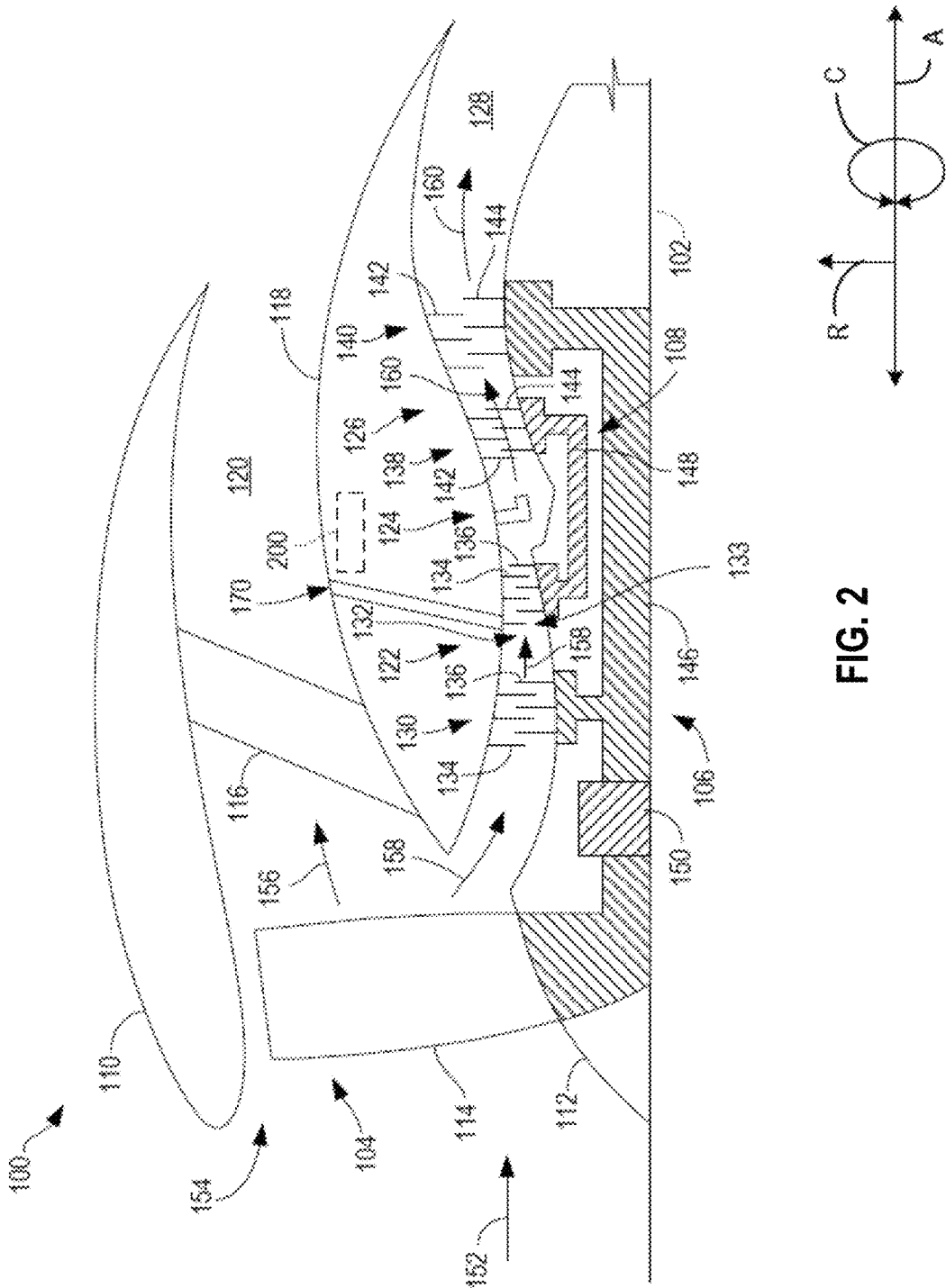
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough.

Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes the low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include a thermal management system 200 for transferring heat between fluids supporting the operation of the aircraft 10. In this respect, the thermal management system 200 can be positioned within the engine 100. For example, as shown in FIG. 2, the thermal management system 200 is positioned within the outer casing 118 of the engine 100. However, in some other examples, the thermal management system 200 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the second portion 158 of the air 152 from the compressor section 122 to bypass the combustion section 124. More specifically, in some examples, the third-stream flow path 170 defines a concentric or non-concentric passage relative to the compressed air flow path 133 downstream of one or more of the compressors 130, 132 or the fan 104. The third-stream flow path 170 can be configured to selectively remove the second portion 158 of the air 152 from the compressed air flow path 133 via one or more variable guide vanes, nozzles, or other actuatable flow control structures.

In addition, as will be described below, in some examples, the thermal management system 200 transfers heat to the air flowing through the third-stream flow path 170. However, a pressure and/or a flow rate of a fluid (e.g., a heat exchange fluid such as a supercritical fluid (e.g., supercritical carbon dioxide ($sCO_2$), etc.)) within the thermal management system 200 limits a rate at which thermal energy is transferred between the air and the heat exchange fluid. Additionally, it is advantageous for the thermal management system 200 to produce the pressure and/or the flow rate with pumps that support axial thrusts of the shaft within the pump to improve the lifespan and/or efficiency of the pump(s) and the thermal management system 200.

Although examples disclosed herein are described with reference to the gas turbine engine 100 of FIG. 2, examples disclosed herein can be applicable to another type or configuration of engine that uses a thermal management system substantially similar to the thermal management system 200 of FIGS. 1-2. Thus, the present subject matter can be readily adaptable to another engine, a gas turbine generator, and/or another heat transfer application associated with another type of vehicle.

Figure 3A:
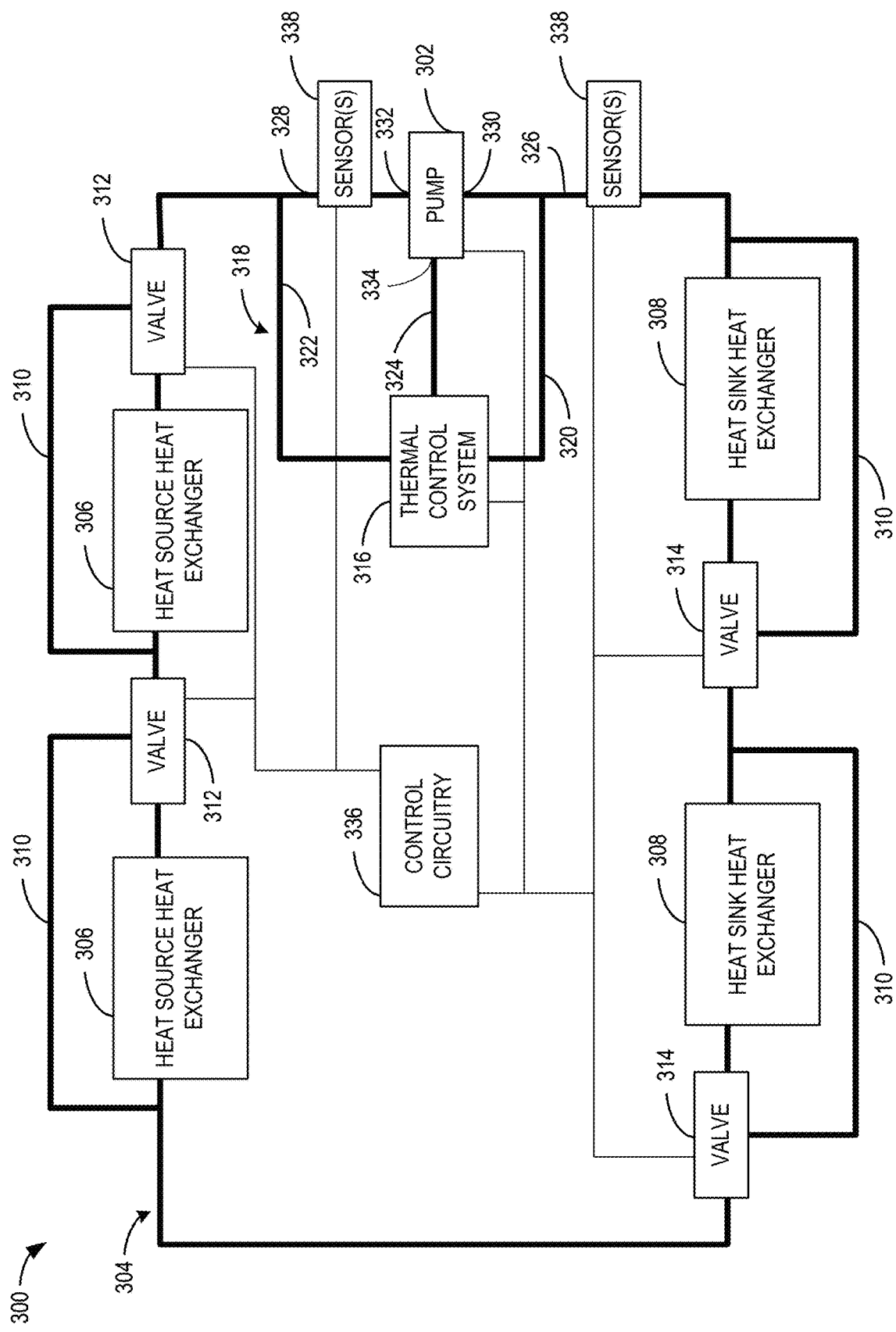
FIG. 3A is a first schematic diagram of an example thermal management system for transferring heat between fluids in accordance with the teachings disclosed herein.
Figure 3B:
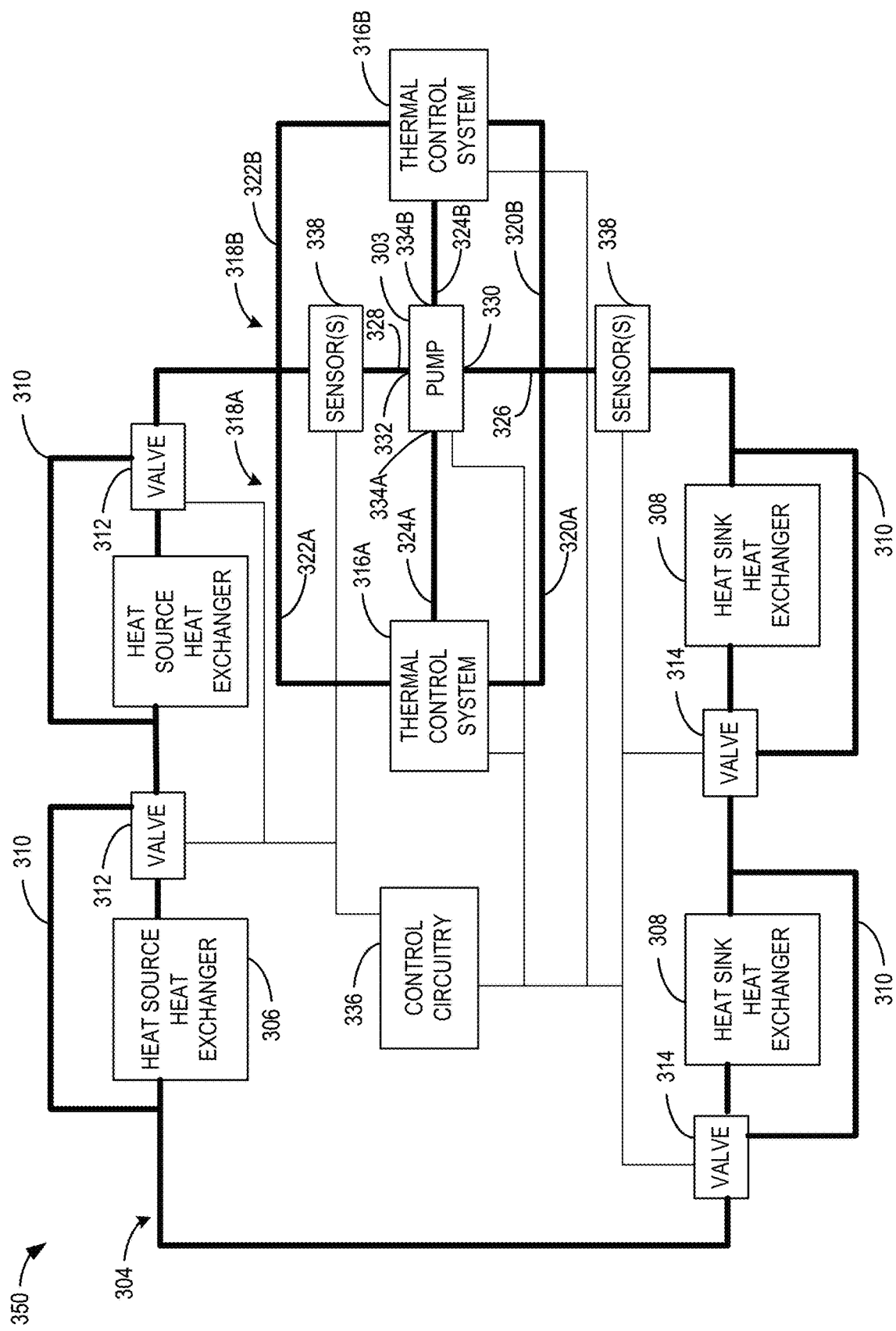
FIG. 3B is a second schematic diagram of an example thermal management system for transferring heat between fluids in accordance with the teachings disclosed herein.

FIG. 3A is a schematic view of an example implementation of a first thermal management system 300 (e.g., an example implementation of the thermal management system 200 of FIGS. 1 and/or 2) for transferring heat between fluids (e.g., between a heat exchange fluid, such as gaseous or supercritical carbon dioxide ($sCO_2$), and one or more working fluids associated with the aircraft 10 of FIG. 1 and/or the gas turbine engine 100 of FIG. 2). FIG. 3B is a schematic view of an example implementation of a second thermal management system 350 (e.g., another example implementation of the thermal management system 200 of FIGS. 1 and/or 2) for transferring heat between fluids (e.g., between a heat exchange fluid, such as gaseous or supercritical carbon dioxide ($sCO_2$), and one or more working fluids associated with the aircraft 10 of FIG. 1 and/or the gas turbine engine 100 of FIG. 2).

In the illustrated example of FIG. 3A, the thermal management system 300 includes a pump 302 (e.g., a thermal transport bus pump, a centrifugal pump) fluidly coupled to a closed-loop thermal transport bus 304 (e.g., interconnected conduits containing a thermal transport fluid). In the illustrated example of FIG. 3B, the thermal management system 350 includes a pump 303 (e.g., having a different structure than that of the pump 302 of FIG. 3A, as discussed in further detail below) fluidly coupled to the thermal transport bus 304. Advantageously, the thermal management systems 300, 350 enable fluid in a liquid state within the pumps 302, 303 and/or the thermal transport bus 304 to be converted to a gaseous and/or supercritical state in advance of pump operations (e.g., during pre-start operations, before the pumps 302, 303 drive the fluid in the thermal transport bus 304). As used herein, "pre-start operations" refers to operations that occur before the pump 302, 303 begins operating (e.g., before a drive signal is delivered to the pump 302, 303, before the pump 302, 303 propels the fluid through the thermal transport bus 304). In general, the thermal management systems 300, 350 are discussed in the context of the aircraft 10 and the gas turbine engine 100 described above and shown in FIGS. 1 and 2. However, the thermal management systems 300, 350 can be implemented within another type of aircraft and/or another gas turbine of another configuration.

In the illustrated example of FIGS. 3A and 3B, the thermal management systems 300, 350 include one or more heat source heat exchangers 306 arranged along the thermal transport bus 304. More specifically, the heat source heat exchanger(s) 306 are fluidly coupled to the thermal transport bus 304 such that the heat exchange fluid flows through the heat source heat exchanger(s) 306. In this respect, the heat source heat exchanger(s) 306 are configured to transfer heat from fluids supporting the operation of the aircraft 10 to the heat exchange fluid, which cools the fluids supporting the operation of the aircraft 10. Thus, the heat source heat exchanger(s) 306 add heat to the heat exchange fluid. Although FIGS. 3A and 3B illustrate two heat source heat exchangers 306, the thermal management systems 300, 350 can include a single heat source heat exchanger 306 or three or more heat source heat exchangers 306.

The heat source heat exchanger(s) 306 can correspond to many configurations of heat exchanger(s) that cool a fluid supporting the operation of the aircraft 10. In some examples, at least one of the heat exchangers 306 is a heat exchanger(s) of the lubrication system(s) of the engine(s) 100 (FIG. 2). In such examples, the heat exchanger(s) 306 transfer heat from the oil lubricating the engine(s) 100 to the heat transfer fluid. In some other examples, at least one of the heat exchangers 306 is a heat exchanger(s) of the cooling system of the engine(s) 100. In such examples, the heat exchanger(s) 306 transfer heat from the cooling air bled from the compressor section(s) 122 (FIG. 2) (or a compressor discharge plenum) of the engine(s) 100 to the heat transfer fluid. However, in some other examples, the heat source heat exchanger(s) 306 correspond to other types of heat exchangers that cool a fluid supporting the operation of the aircraft 10 (FIG. 1).

Furthermore, the thermal management systems 300, 350 include a plurality of heat sink heat exchangers 308 arranged along the thermal transport bus 304. More specifically, the heat sink heat exchangers 308 are fluidly coupled to the thermal transport bus 304 such that the heat exchange fluid flows through the heat sink heat exchangers 308. In this respect, the heat sink heat exchangers 308 are configured to transfer heat from the heat exchange fluid to other fluids supporting the operation of the aircraft 10, which heats the other fluids supporting the operation of the aircraft 10. Thus, the heat sink heat exchangers 308 remove heat from the heat exchange fluid. Although FIGS. 3A-3B illustrate two heat sink heat exchangers 308, the thermal management systems 300, 350 can include three or more heat sink heat exchangers 308.

The heat sink heat exchangers 308 can correspond to many configurations of heat exchangers that heat a fluid supporting the operation of the aircraft 10. For example, at least one of the heat exchangers 308 is a heat exchanger(s) of the fuel system(s) of the engine(s) 100. In such examples, the fuel system heat exchanger(s) 308 transfer heat from the heat transfer fluid to the fuel supplied to the engine(s) 100. In some other examples, at least one of the heat exchangers 308 is a heat exchanger(s) in contact with the first portion 156 of the air 152 (FIG. 2) flowing through the bypass airflow passage(s) 120 (FIG. 2) of the engine(s) 100. In such examples, the heat exchanger(s) 308 transfer heat from the heat exchange fluid to the first portion 156 of the air 152 flowing through the bypass airflow passage(s) 120.

In some examples, one or more of the heat exchangers 308 are configured to transfer heat to the air flowing through the third-stream flow path 170. In such examples, the heat exchanger(s) 308 are in contact with the air flow through the third-stream flow path 170 (FIG. 2). Thus, heat from the heat exchange fluid flowing through the thermal transport bus 304 can be transferred to the air flow through the third-stream flow path 170. The use of the third-stream flow path 170 as a heat sink for the thermal management systems 300, 350 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat exchanger(s) 308 to be smaller than heat exchangers relying on other heat sinks within the engine 100. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in some other examples, the heat sink heat exchangers 308 correspond to other types of heat exchangers that heat a fluid supporting the operation of the aircraft 10.

Moreover, in some examples, the thermal management systems 300, 350 include one or more bypass conduits 310. Specifically, as shown, each bypass conduit 310 is part of or fluidly coupled to the thermal transport bus 304 such that the bypass conduit 310 allows at least a portion of the heat exchange fluid to bypass one of the heat exchangers 306, 308. In some examples, the heat exchange fluid bypasses one or more of the heat exchangers 306, 308 to adjust the temperature of the heat exchange fluid within the thermal transport bus 304. The flow of example heat exchange fluid through the bypass conduit(s) 310 are controlled to regulate the pressure of the heat exchange fluid within the thermal transport bus 304. In the illustrated example of FIGS. 3A-3B, each heat exchanger 306, 308 has a corresponding bypass conduit 310. However, in some other examples, other numbers of heat exchangers 306, 308 can have a corresponding bypass conduit 310 as long as there is at least one bypass conduit 310.

Additionally, in some examples, the thermal management systems 300, 350 include one or more heat source valves 312 and one or more heat sink valves 314. In general, each heat source valve 312 is configured to control the flow of the heat exchange fluid through a bypass conduit 310 that bypasses a heat source heat exchanger 306. Similarly, each heat sink valve 314 is configured to control the flow of the heat exchange fluid through a bypass conduit 310 that bypasses a heat sink heat exchanger 308. In this respect, each valve 312, 314 is operatively coupled to the thermal transport bus 304 and/or a corresponding bypass conduit 310. As such, each valve 312, 314 can be moved between fully and/or partially opened and/or closed positions to selectively occlude the flow of heat exchange through its corresponding bypass conduit 310.

As used herein, "normal operations" refers to operations that occur in conjunction with the pump 302, 303 propelling the fluid through the thermal transport bus 304. During normal operations (e.g., when the pumps 302, 303 drive movement of the heat exchange fluid), the valves 312, 314 are controlled based on the pressure of the heat exchange fluid within the thermal transport bus 304. More specifically, as indicated above, in certain instances, the pressure of the heat exchange fluid flowing through the thermal transport bus 304 can fall outside of a desired pressure range. When the pressure of the heat exchange fluid is too high, the thermal management systems 300, 350 can incur accelerated wear. In this respect, when the pressure of the heat exchange fluid within the thermal transport bus 304 exceeds a maximum or otherwise increased pressure value, one or more heat source valves 312 open. In such examples, at least a portion of the heat exchange fluid flows through the bypass conduits 310 instead of the heat source heat exchanger(s) 306. Thus, less heat is added to the heat exchange fluid by the heat source heat exchanger(s) 306, which reduces the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In some other examples, the maximum pressure value is between 1300 and 1500 pounds per square inch, such as 1400 pounds per square inch. Such maximum pressure values generally prevent the thermal management systems 300, 350 from incurring accelerated wear.

In some examples, the maximum pressure value is set prior to and/or during operation based on one or more parameters (e.g., materials utilized, pump 302, 303 design, aircraft 10 design (FIG. 1), gas turbine engine 100 design (FIG. 2), heat exchange fluid, etc.) associated with the thermal management systems 300, 350. The example maximum pressure value can be adjusted relative to the pressure capacities of the thermal transport bus 304, the pumps 302, 303, the heat exchangers 306, 308, the bypass conduit(s) 310, and/or the valves 312, 314.

Conversely, when the pressure of the heat exchange fluid is too low, the pump 302, 303 can experience operability problems and increased wear. As such, when the pressure of the heat exchange fluid within the thermal transport bus falls below a minimum or otherwise reduced pressure value, one or more heat sink valves 314 open. In such examples, at least a portion of the heat exchange fluid flows through the bypass conduits 310 instead of the heat sink heat exchangers 308. Thus, less heat is removed from the heat exchange fluid by the heat sink heat exchangers 308, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid is in a supercritical state (e.g., when the heat exchange fluid is supercritical carbon dioxide). As such, the thermal management systems 300, 350 can be configured to operate such that the pressure of the heat transport fluid is maintained within a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch. Accordingly, the operation of the pump 302, 303 and the valves 312, 314 allows the disclosed thermal management systems 300, 350 to maintain the pressure of the heat exchange fluid within the thermal transport bus 304 within a specified range of values as the thermal load placed on the thermal management systems 300, 350 varies.

Furthermore, during normal operations, the example pumps 302, 303 drive the flow of the heat exchange fluid through the thermal management systems 300, 350. In some examples, the thermal management systems 300, 350 include one pump 302, 303 or multiple pumps 302, 303 depending on the desired flow rate, change in pressure across the pump 302, 303, and/or the kinetic energy loss of the heat exchange fluid in the thermal transport bus 304. For example, the pumps 302, 303 can increase the output pressure head to accelerate the flow of the heat exchange fluid to a first flowrate. During normal operations, as the heat exchange fluid passes through the thermal transport bus 304, the example kinetic energy of the heat exchange fluid dissipates due to friction, temperature variations, etc. Due to the kinetic energy losses, the heat exchange fluid decelerates to a second flow rate at some point upstream of the pump 302, 303. When the example second flow rate is below a desired operating flow rate of the heat exchange fluid, the pump 302, 303 can either be of a different architecture that outputs a higher first flow rate, or one or more additional pumps 302, 303 can be included in the thermal management systems 300, 350.

When the thermal management systems 300, 350 have been inactive for a period of time (e.g., the heat exchange fluid has been static in the pump 302, 303 and/or the thermal transport bus 304), a pressure and/or a temperature of the heat exchange fluid decreases. As such, the heat exchange fluid in the pump 302, 303 and/or the thermal transport bus 304 can convert from the desired gaseous and/or supercritical state to a liquid state. Fluid in the liquid state adversely affects the functionality of the pump 302, 303, such as by causing one or more foil bearing(s) of the pump 302, 303 to encounter windage loss, an increased film thickness/stiffness, etc., that prevents or hinders separation between the foil bearing(s) and the rotating component (e.g., a shaft, a disc, etc.) supported by the foil bearing(s).

In the illustrated example of FIG. 3A, the thermal management system 300 includes a thermal control system 316 to remove liquid from the foil bearings of the pump 302, in advance of normal operations (e.g., before a motor of the pump 302, 303 drives an impeller of the pump 302, 303, before the pump 302, 303 drives the heat exchange fluid through the thermal transport bus 304, etc.). Similarly, in the illustrated example of FIG. 3B, the thermal management system 350 includes a first thermal control system 316A (e.g., the thermal control system 316 of FIG. 3A in a first position or location in the thermal management system 350) and a second thermal control system 316B (e.g., the thermal control system 316 of FIG. 3A in a second position or location in the thermal management system 350). In the illustrated examples of FIGS. 3A and 3B, the thermal control system(s) 316, 316A, 316B pressurize and/or heat the fluid and injects the heated and/or pressurized fluid into the pump 302, 303. As such, the heated and/or pressurized fluid can change the state of the fluid in the pump 302, 303 or at least within the foil bearings of the pump 302, 303, from the liquid state to a gaseous and/or supercritical state. For example, during pre-start operations (e.g., in advance of normal operations, before the pump 302, 303 drives the fluid through the thermal transport bus 304, before a drive signal is delivered to the pump 302, 303), the thermal control system(s) 316, 316A, 316B can increase the temperature and/or the pressure of the fluid in the pump 302, 303 to cause the fluid to convert from the liquid state to the gaseous and/or supercritical state. Additionally or alternatively, during the pre-start operations, the thermal control system(s) 316, 316A, 316B can inject the gaseous and/or supercritical fluid into the pump 302, 303 such that the gaseous and/or supercritical fluid moves (e.g., pushes) the fluid that is in the liquid state out of and/or away from the foil bearings of the pump 302, 303. Thus, during the pre-start operations, the thermal control system(s) 316, 316A, 316B replace at least a portion of the fluid in the pump 302, 303 that is in the liquid state with fluid that is in a gaseous and/or supercritical state in advance of the pump 302, 303 beginning normal operations. As a result, the thermal control system(s) 316, 316A, 316B enable the pump 302, 303 to operate without adversely affecting a functionality of the foil bearings and, in turn, operations of the pump 302, 303.

In addition, during normal operations (e.g., when the pump 302, 303 is driving the heat exchange fluid), the thermal control system 316, 316A, 316B can inject cooler fluid into the pump 302, 303 to maintain a temperature within the pump 302, 303 within a predetermined temperature range (e.g., between approximately 150 degrees)(° Fahrenheit (F) and 300° F.) that enables optimal functionality of the motor and/or the foil bearing(s) of the pump 302, 303. For example, the predetermined temperature range can enable the fluid to remain in the gaseous and/or supercritical state while minimizing or reducing vibrations encountered by the foil bearing(s) and maintaining a functionality of the motor of the pump 302, 303. Thus, the thermal control system 316, 316A, 316B controls a thermal energy of the fluid encountered by the pump 302, 303 prior to pump 302, 303 operations and during pump 302, 303 operations to improve pumping parameters (e.g., a change in pressure across the pump 302, 303, a flow rate of the fluid, etc.) and/or a lifespan of the pump 302, 303. Example implementations of the thermal control system(s) 316, 316A, 316B are discussed in further detail below.

In the illustrated example of FIGS. 3A-3B, the thermal control system 316, 316A, 316B includes or is coupled to feedback conduits 318 (e.g., one or more interconnected fluid conduits, a feedback fluid bus). More particularly, the feedback conduits 318 include at least one first feedback conduit 320, at least one second feedback conduit 322, and at least one third feedback conduit 324. Similarly, in the illustrated example of FIG. 3B, the first thermal control system 316A includes or is coupled to first feedback conduits 318A (e.g., the feedback conduits 318 of FIG. 3A in a first position or location in the thermal management system 350) and second feedback conduits 318B (e.g., the feedback conduits 318 of FIG. 3A in a second position or location in the thermal management system 350). Accordingly, the first feedback conduits 318A include at least one first feedback conduit 320A (e.g., the first feedback conduit(s) 320 in a first position), at least one second feedback conduit 322A (e.g., the second feedback conduit(s) 322 of FIG. 3A in a first position), and at least one third feedback conduit 324A (e.g., the third feedback conduit(s) 324 of FIG. 3A in a first position). Similarly, the second feedback conduits 318B include at least one first feedback conduit 320B (e.g., the first feedback conduit(s) 320 in a second position), at least one second feedback conduit 322B (e.g., the second feedback conduit(s) 322 in a second position), and at least one third feedback conduit 324B (e.g., the third feedback conduit(s) 324 in a second position).

In the illustrated example of FIGS. 3A and 3B, the thermal transport bus 304 includes a primary input conduit 326 and a primary output conduit 328. The primary input conduit 326 includes an end coupled to the pump 302, 303 at a primary inlet 330 of the pump 302, 303. Further, the primary output conduit 328 includes an end coupled to the pump at a primary outlet 332 of the pump 302, 303. Thus, the primary input conduit 326 and the primary output conduit 328 are fluidly coupled to the pump 302, 303. More particularly, the primary input conduit 326 delivers fluid to the pump 302, 303, and the primary output conduit 328 receives fluid from the pump. The pump 302, 303 includes an impeller that drives the fluid that flows through the primary inlet 330 through the primary outlet 332 during pump operation, as discussed in further detail below.

In the illustrated examples of FIGS. 3A and 3B, the first feedback conduit(s) 320 include an end coupled to the primary input conduit 326 upstream of the primary inlet 330 of the pump 302, 303. Specifically, the end of the first feedback conduit(s) 320 include an opening that aligns with an opening in the primary input conduit 326 to fluidly couple the first feedback conduit(s) 320 to the primary input conduit 326. Similarly, the second feedback conduit(s) 322 include an end coupled to the primary output conduit 328 downstream of the primary outlet 332 of the pump 302, 303. More particularly, the end of the second feedback conduit(s) 322 include an opening that aligns with an opening of the primary output conduit 328 to fluidly couple the second feedback conduit(s) 322 to the primary output conduit 328. Further, the third feedback conduit(s) 324 include one or more ends coupled to the pump 302, 303 at one or more secondary inlets 334, 334A, 334B of the pump 302, 303. That is, the end(s) of the third feedback conduit(s) 324 include an opening that aligns with the secondary inlet(s) 334 of the pump 302, 303 to fluidly couple the third feedback conduit(s) 324 to the pump 302, 303. Thus, the third feedback conduit(s) 324 can deliver the fluid to the pump 302, 303. The pump 302 of FIG. 3A is different from the pump 303 of FIG. 3B in that the pump 303 includes double the secondary inlet(s) 334A, 334B of the pump 302 as a result of receiving fluid from the first feedback conduits 318A and the second feedback conduits 318B.

As discussed in further detail below, the secondary inlet(s) 334 of the pumps 302, 303 are different from the primary inlet 330 as the fluid that enters the pump 302, 303 via the secondary inlet 334 flows into a separate area (e.g., a separate chamber) of the pump 302, 303 from the fluid that enters the pump 302, 303 via the primary inlet 330. More particularly, the pumps 302, 303 include one or more conduits or flowlines in connection with the secondary inlet(s) 334 that direct the fluid to one or more foil bearing(s) and/or a motor in the pump 302, 303 while the fluid that flows through the primary inlet 330 encounters the impeller of the pump 302, 303.

In some examples, the thermal management systems 300, 350 include a valve operatively coupled to the end of the first feedback conduit(s) 320. In such examples, a position of the valve can control whether and/or how much fluid in the primary input conduit 326 flows through the thermal control system 316, 316A, 316B. Similarly, in some examples, the thermal management systems 300, 350 includes another valve operatively coupled to the end of the second feedback conduit(s) 322. In such examples, the valve controls whether and/or how much fluid in the primary output conduit 328 flows through the thermal control system 316, 316A, 316B. The valve(s) at the end of the feedback conduits 320, 322 may be part of the thermal control system 316, 316A, 316B, as discussed in further detail below.

In the illustrated example of FIGS. 3A-3B, the thermal management systems 300, 350 include control circuitry 336 to control operations of the pump 302 and/or the thermal control system 316, 316A, 316B based on the pressure in the pump 302 and/or the thermal transport bus 304, the temperature of the heat exchange fluid within the pump 302, 303 and/or the thermal transport bus 304, and/or an activity level (e.g., an encountered period of activity, an encountered period of inactivity) of the thermal management system 300, 350. The control circuitry 336 of FIGS. 3A and 3B may be instantiated (e.g., creating an instance of, bring into being for any length of time, materialize, implement, etc.) by programmable circuitry such as a Central Processor Unit (CPU) executing first instructions. Additionally or alternatively, the control circuitry 336 of FIGS. 3A and 3B may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the control circuitry 336 of FIGS. 3A and 3B may, thus, be instantiated at the same or different times. Some or all of the control circuitry 336 of FIGS. 3A and 3B may be instantiated, for example, in one or more threads executing concurrently on hardware and/or in series on hardware. Moreover, in some examples, some or all of the control circuitry 336 of FIGS. 3A and/or 3B may be implemented by microprocessor circuitry executing instructions and/or FPGA circuitry performing operations to implement one or more virtual machines and/or containers. In some examples, the control circuitry 336 of FIGS. 3A and 3B is instantiated by programmable circuitry executing control instructions and/or configured to perform operations such as those represented by the flowchart of FIG. 7.

In the illustrated example of FIGS. 3A and 3B, the thermal management systems 300, 350 include sensors 338. The sensors 338 include one or more pressure sensors and one or more temperature sensors operatively coupled to the thermal transport bus 304 and/or the pump 302, 303 to measure a pressure and a temperature of the heat exchange fluid. Although the illustrated examples of FIGS. 3A and 3B show one or more sensor(s) 338 operatively coupled to the primary input conduit 326 and one or more sensor(s) 338 operatively coupled to the primary output conduit 328, it should be appreciated that the thermal management systems 300, 350 can include any number of the sensor(s) 338 in alterative locations to measure the temperature and the pressure of the fluid in the thermal management systems 300, 350.

In the illustrated example of FIGS. 3A-3B, the control circuitry 336 is communicatively coupled to the pump 302, 303, the valves 312, 314, the thermal control system 316, 316A, 316B, and the sensors 338. The control circuitry 336 controls the pump 302, 303, the valves 312, 314, and/or the thermal control system 316, 316A, 316B based on the pressure and/or the temperature of the heat exchange fluid measured by the sensors 338. For example, the control circuitry 336 can determine whether and/or how much of the fluid in the pump 302, 303 and/or the thermal transport bus 304 is in the liquid state. Further, the control circuitry 336 can determine that the thermal control system 316, 316A, 316B is to perform pre-start operations when the fluid in the pump 302, 303 and/or the thermal transport bus 304 that is in the liquid state does not satisfy (e.g., is greater than, is greater than or equal to) a liquid threshold.

The liquid threshold may vary based on the associated thermal management systems 300, 350. In some examples, the liquid threshold is not satisfied when there is any fluid in the liquid state in the pump 302, 303 and/or the thermal transport bus 304. In some examples, the liquid threshold is not satisfied when there is fluid in the liquid state in a certain area of the system 300, 350 (e.g., in the pump 302, 303, in the primary input conduit 326, in the primary output conduit 328, etc.). In some examples, the liquid threshold is not satisfied when the amount of fluid that is in the liquid state relative to the total volume of fluid in the system satisfies (e.g., is greater than, is greater than or equal to) a threshold percentage (e.g., 1%, 5%, etc.). In some examples, the liquid threshold is not satisfied when the amount of fluid that is in the liquid state satisfies (e.g., is greater than, is greater than or equal to) a threshold volume (e.g., 5 milliliters (mL), 25 mL, 100 mL, etc.). Additionally or alternatively, the liquid threshold may include one or more pressure thresholds and/or one or more temperature thresholds. In some examples, the pressure threshold is based on a critical point pressure of the fluid (e.g., 73.8 bar for CO2) and the temperature threshold is based on a critical point temperature of the fluid (e.g., 87.8° F. for CO2). In some examples, the control circuitry 336 can utilize a combination of a pressure threshold and/or a temperature threshold to determine whether the measured pressure and/or temperature of the fluid is indicative of the fluid being in a liquid state. That is, the control circuitry 336 can determine the pressure threshold based on the temperature of the fluid. In such examples, the control circuitry 336 determines the pressure threshold based on a pressure (e.g., a minimum pressure) of the fluid that would be indicative of the fluid not being in the liquid state at the measured temperature. Similarly, the control circuitry 336 can determine the temperature threshold based on the pressure of the fluid. In such examples, the control circuitry 336 determines the temperature threshold based on a temperature (e.g., a minimum temperature) of the fluid that would be indicative of the fluid not being in the liquid state at the measured pressure.

When the control circuitry 336 determines that pre-start operations are to be performed, the control circuitry 336 causes the thermal control system 316, 316A, 316B to inject heated and/or pressurized fluid into the pump 302, 303. In some examples, the control circuitry 336 causes the pre-start operations to be performed for a predetermined period of time and/or until the liquid threshold is satisfied. When the control circuitry 336 determines that normal operations are to be performed, the control circuitry 336 causes the pump 302, 303 to drive the fluid through the thermal transport bus 304. For example, the control circuitry 336 can transmit a drive signal to the motor of the pump. During normal operations, the control circuitry 336 can control the pump 302, 303 and/or the valves 312, 314 based on the temperature and/or the pressure of the fluid. Further, during normal operations, the control circuitry 336 causes the thermal control system 316, 316A, 316B to inject cooling fluid into the pump 302, 303.

Figure 3C:
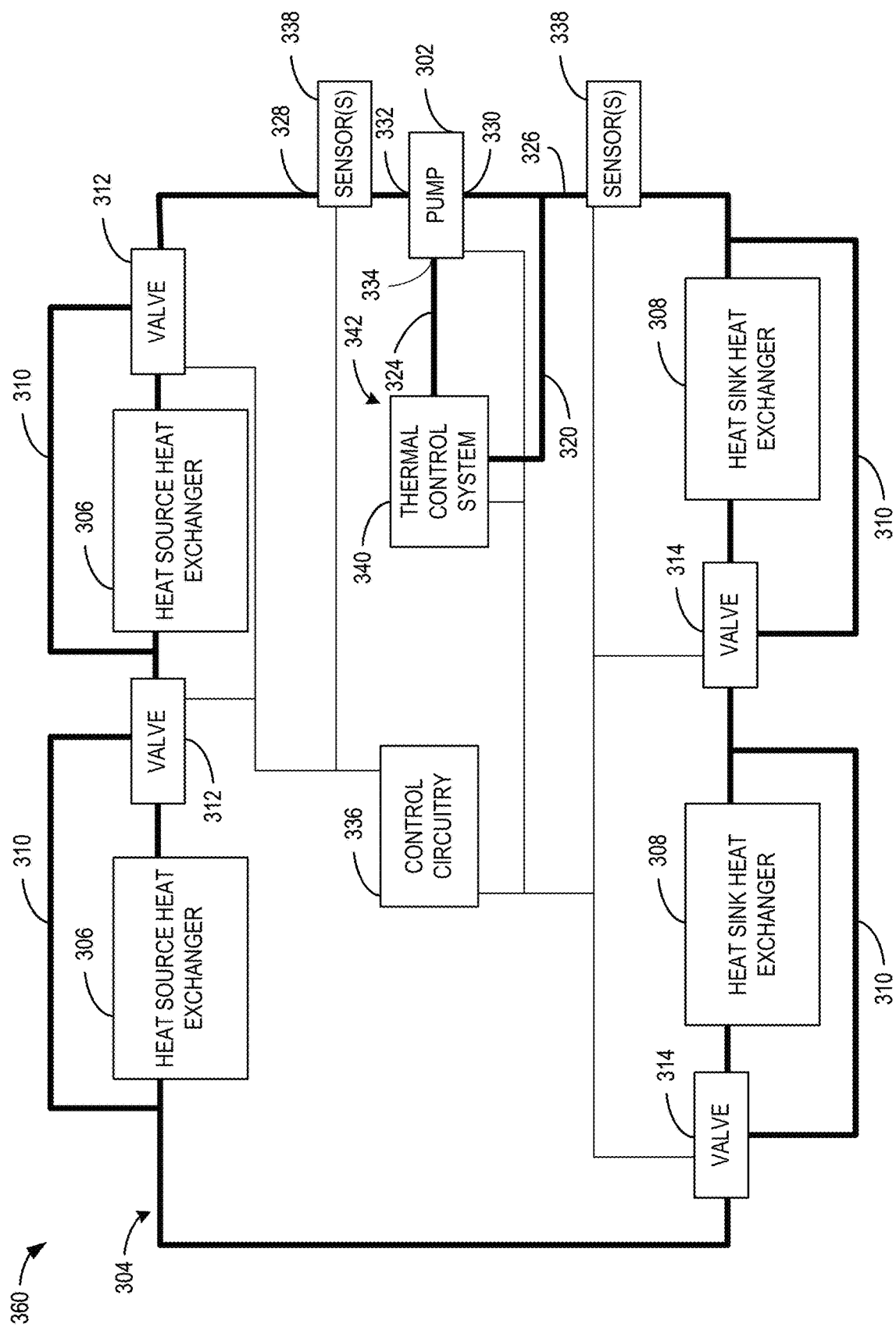
FIG. 3C is a third schematic diagram of an example thermal management system for transferring heat between fluids in accordance with the teachings disclosed herein.

FIG. 3C is a schematic view of an example implementation of a third thermal management system 360 (e.g., an example implementation of the thermal management system 200 of FIGS. 1 and/or 2) for transferring heat between fluids (e.g., between a heat exchange fluid, such as gaseous or supercritical carbon dioxide ($sCO_2$), and one or more working fluids associated with the aircraft 10 of FIG. 1 and/or the gas turbine engine 100 of FIG. 2). In the illustrated example of FIG. 3C, the thermal management system 360 includes the pump 302, the thermal transport bus 304, the heat source heat exchangers 306, the heat sink heat exchangers 308, the bypass conduits 310, the bypass valves 312, 314, the primary input conduit 326 coupled to the primary inlet 330, the primary output conduit 328 coupled to the primary outlet 332, the control circuitry 336, and the sensors 338. In the illustrated example of FIG. 3C, the thermal management system 360 includes another example thermal control system 340 including one or more feedback conduit(s) 342. In the illustrated example of FIG. 3C, the feedback conduit(s) 342 include the first feedback conduit(s) 320 and the third feedback conduit(s) 324.

Figure 3D:
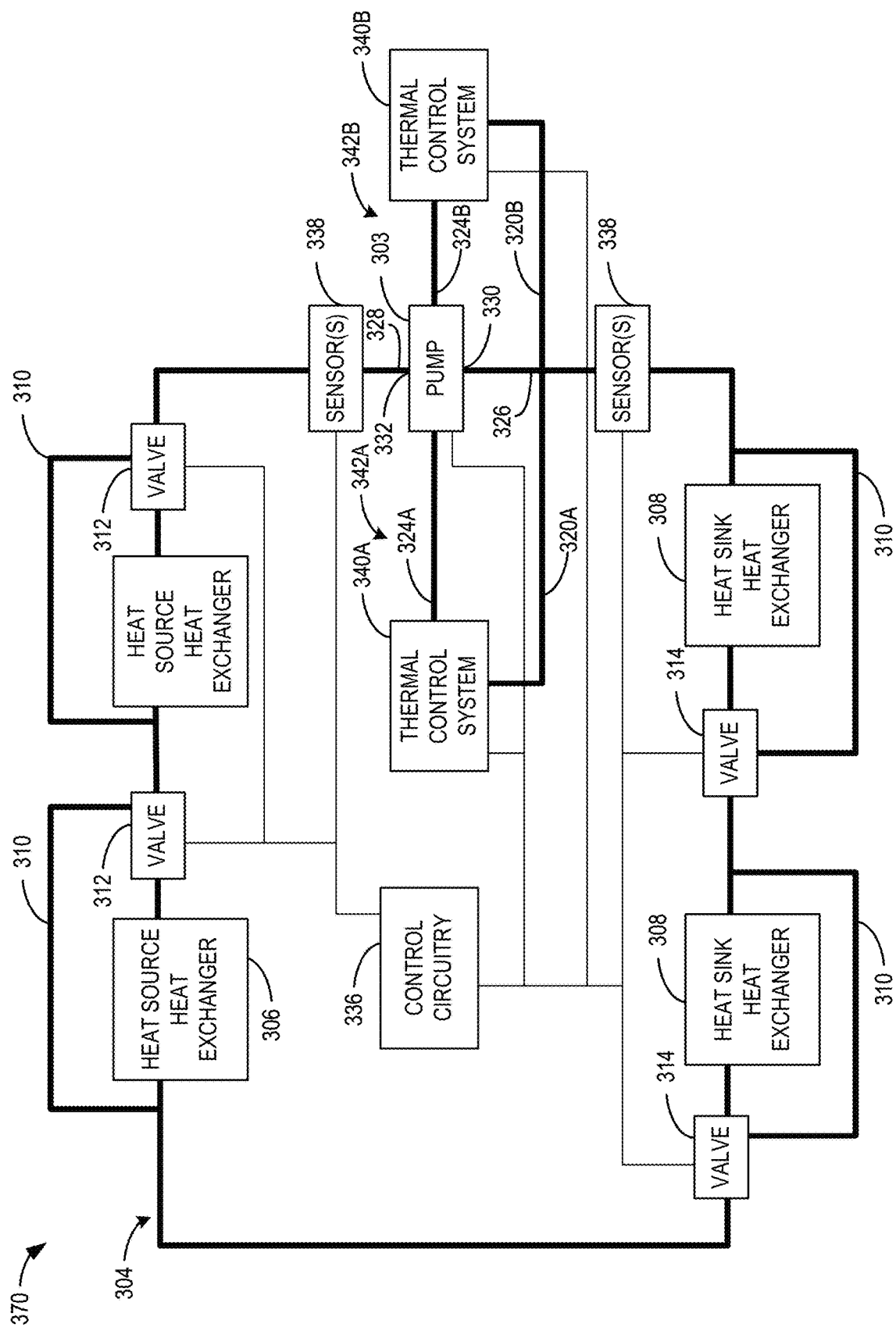
FIG. 3D is a fourth schematic diagram of an example thermal management system for transferring heat between fluids in accordance with the teachings disclosed herein.

FIG. 3D is a schematic view of an example implementation of a fourth thermal management system 370 (e.g., an example implementation of the thermal management system 200 of FIGS. 1 and/or 2) for transferring heat between fluids (e.g., between a heat exchange fluid, such as gaseous or supercritical carbon dioxide ($sCO_2$), and one or more working fluids associated with the aircraft 10 of FIG. 1 and/or the gas turbine engine 100 of FIG. 2). In the illustrated example of FIG. 3D, the thermal management system 370 includes the pump 303, the thermal transport bus 304, the heat source heat exchangers 306, the heat sink heat exchangers 308, the bypass conduits 310, the bypass valves 312, 314, the primary input conduit 326 coupled to the primary inlet 330, the primary output conduit 328 coupled to the primary outlet 332, the control circuitry 336, and the sensors 338. In the illustrated example of FIG. 3D, the thermal management system 370 includes the thermal control systems 340A, 340B, which include feedback conduits 342A, 342B, respectively. Accordingly, the feedback conduits 342A include the first feedback conduit(s) 320A and the third feedback conduit(s) 324A, and the feedback conduits 342B include the first feedback conduit(s) 320B and the third feedback conduit(s) 324B.

In the illustrated examples of FIGS. 3C-3D, the control circuitry 336 controls the thermal control system 340 similar to the thermal control systems 316 of FIGS. 3A-3B. Specifically, when the fluid is in the pump 302, 303 and/or the thermal transport bus 304 does not satisfy the liquid threshold, the control circuitry 336 causes the thermal control system 340 to perform pre-start operations. Moreover, when the control circuitry 336 determines that pre-start operations are to be performed, the control circuitry 336 causes the thermal control system 340 to inject heated and/or pressurized fluid into the pump 302, 303. Further, when the fluid in the pump 302, 303 and/or the thermal transport bus 304 satisfies the liquid threshold, the control circuitry 336 causes the thermal control system 340 to perform normal operations during which the pump 302, 303 drives the fluid through the thermal transport bus 304. Additionally, during normal operations, the control circuitry 336 causes the thermal control system 340 to inject cooling fluid into the pump 302, 303.

Figure 4A:
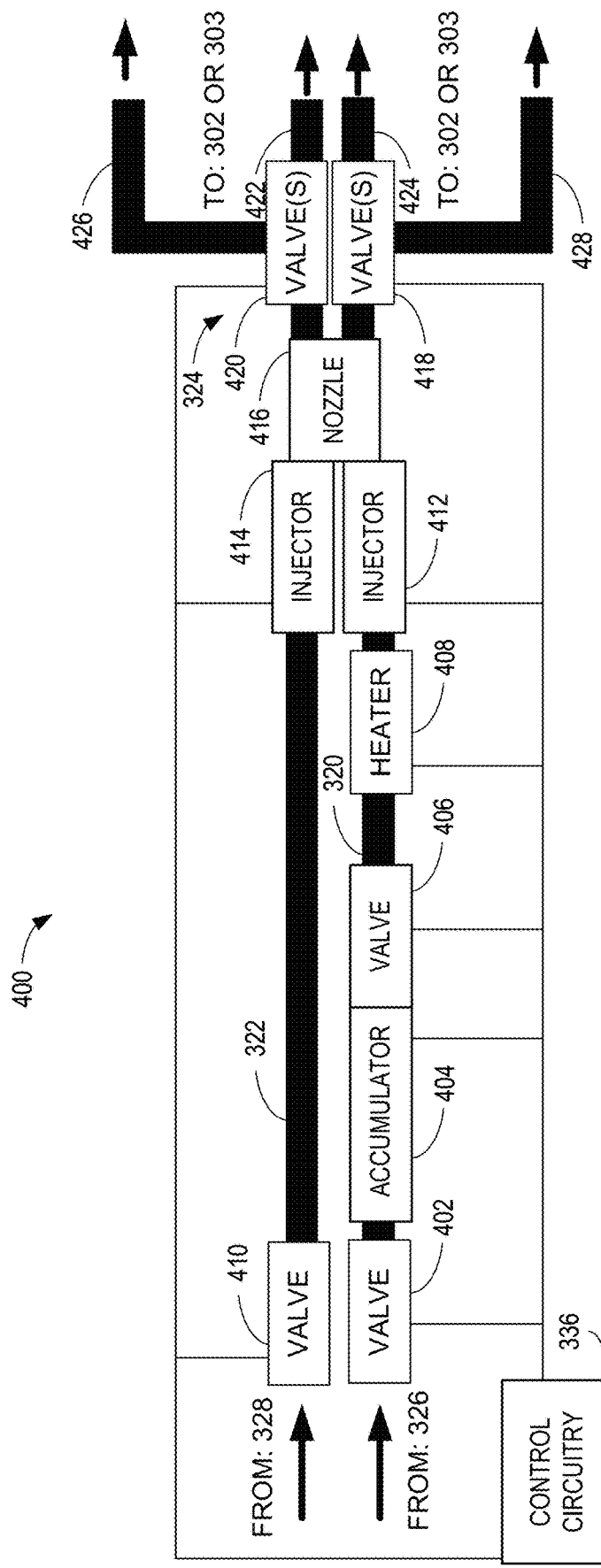
FIG. 4A is a first schematic diagram of an example thermal control system of the example thermal management system of FIGS. 3A and/or 3B.

FIG. 4A is a schematic representative of a first example thermal control system 400 (e.g., a first example implementation of the thermal control system(s) 316 of FIGS. 3A-3B). In the illustrated example of FIG. 4A, the thermal control system 400 includes a first valve 402, an accumulator 404, a second valve 406, a heater 408, a third valve 410, a first injector 412, a second injector 414, a nozzle 416, at least one fourth valve(s) 418, and at least one fifth valve(s) 420. The thermal control system 400 also includes the first feedback conduit(s) 320, the second feedback conduit(s) 322, and the third feedback conduit(s) 324. In the illustrated example of FIG. 4A, the third feedback conduit(s) 324 form a first secondary input 422, a second secondary input 424, a third secondary input 426, and a fourth secondary input 428.

In the illustrated example of FIG. 4A, the first valve 402, the accumulator 404, the second valve 406, and the heater 408 are coupled to the first feedback conduit(s) 320. The first valve 402 is coupled to a first end (e.g., an upstream end) of the first feedback conduit(s) 320. The first injector 412 is coupled to a second end (e.g., a downstream end) of the first feedback conduit(s) 320. More particularly, an opening at the second end of the first feedback conduit(s) 320 is aligned with an inlet of the first injector 412 such that the first feedback conduit(s) 320 deliver fluid to the first injector 412.

In the illustrated example of FIG. 4A, a position of the first valve 402 controls whether and/or how much fluid from the primary input conduit 326 flows into the first feedback conduit(s) 320. For example, a first position (e.g., an open position) of the first valve 402 causes at least a portion of the fluid in the primary input conduit 326 to flow into the first feedback conduit(s) 320. Further, a second position (e.g., a closed position) of the first valve 402 blocks the fluid in the primary input conduit 326 from flowing into the first feedback conduit(s) 320. Moreover, the position of the first valve 402 can be modulated between the first position and the second position (e.g., to one or more partially open positions) to control the amount of fluid from the primary input conduit 326 that enters the first feedback conduit(s) 320 and, thus, fluid parameters (e.g., a flow rate, a pressure, etc.) of the fluid in the first feedback conduit(s) 320.

In the illustrated example of FIG. 4A, the accumulator 404 is coupled to the first feedback conduit 320 between the first valve 402 and the heater 408. The accumulator contains the heat exchange fluid in the liquid state. For example, the accumulator 404 can include a container that houses the fluid in the liquid state. In some examples, the accumulator 404 is filled with the fluid in the liquid state during a period of inactivity of the associated thermal management system 300, 350 (e.g., between flights of the aircraft 10). Further, the accumulator 404 can include a supplementary conduit fluidly coupled to the first feedback conduit(s) 320. That is, a first end of the supplementary conduit can be coupled to the container, and a second end of the supplementary conduit can be coupled to the first feedback conduit(s) 320. In some examples, the accumulator 404 includes a check valve to prevent the fluid in the first feedback conduit(s) 320 from entering the accumulator 404. In some examples, the accumulator 404 enables the fluid in the first feedback conduit(s) that is in the liquid state to enter the accumulator 404. For example, the accumulator 404 can include a second supplementary conduit and gravity can cause the fluid that is in the liquid state to enter the second supplementary conduit while allowing the fluid that is in the supercritical and/or gaseous state to continue flowing in the first feedback conduit(s) 320 past the accumulator 404. In some examples, the accumulator 404 includes one or more sensors that enable the control circuitry 336 to identify the amount of liquid in the accumulator 404. In some examples, the amount of liquid in the accumulator 404 is predetermined in advance of operations based on a volume of the container. In some examples, the accumulator 404 is segmented and the control circuitry 336 opens one or more segments at a time to introduce the liquid contained by the segment(s) into the first feedback conduit(s) 320.

In the illustrated example of FIG. 4A, the second valve 406 is coupled to the first feedback conduit(s) 320 and/or the accumulator 404. For example, the second valve 406 can be coupled to the supplementary conduit of the accumulator 404. Alternatively, the second valve 406 can be coupled to the first feedback conduit(s) 320 and positioned at an opening in the first feedback conduit(s) 320 that is aligned with an opening of the accumulator 404 (e.g., an opening at an end of the supplementary conduit). As such, a position of the second valve 406 can control a flow rate of the fluid that flows from the accumulator into the first feedback conduit(s) 320. In some examples, the first injector 412 controls the amount of fluid in the liquid state that flows from the accumulator 404 into the first feedback conduit(s) 320, as discussed in association with FIGS. 4B and 4D.

In the illustrated example of FIG. 4A, the heater 408 is coupled to the first feedback conduit(s) 320 between the accumulator 404 and the second valve 406. For example, the heater 408 can be positioned around at least a portion of a perimeter of the first feedback conduit(s) 320. The heater 408, when active, generates heat and, in turn, heats the fluid in the first feedback conduit 320. For example, the heater 408 can be implemented by an electric heater (e.g., a strip heater, a tubular heater, a band heater, etc.) that produces heat in response to receiving electrical current. In some examples, the heater 408 corresponds to another type of heat exchanger that transfers heat from another fluid (e.g., a fluid supporting the operation of the aircraft 10 and/or the gas turbine engine 100) to the fluid in the first feedback conduit(s) 320. For example, the heater 408 can be a waste heat recovery heat exchanger associated with the exhaust section 128 of the gas turbine engine 100.

In the illustrated example of FIG. 4A, the third valve 410 and the second injector 414 are coupled to the second feedback conduit 322. The third valve 410 is coupled to a first end (e.g., an upstream end) of the second feedback conduit(s) 322. The second injector 414 is coupled to a second end (e.g., a downstream end) of the second feedback conduit(s) 322. More particularly, an opening at the second end of the second feedback conduit(s) 322 is aligned with an inlet of the second injector 414 such that the second feedback conduit(s) 322 deliver fluid to the second injector 414.

In the illustrated example of FIG. 4A, a position of the third valve 410 controls whether and/or how much fluid from the primary output conduit 328 flows into the second feedback conduit(s) 322 and to the second injector 414. For example, a first position (e.g., an open position) of the third valve 410 causes at least a portion of the fluid in the primary output conduit 328 to flow into the second feedback conduit(s) 322. Further, a second position (e.g., a closed position) of the third valve 410 blocks the fluid in the primary output conduit 328 from flowing into the second feedback conduit(s) 322. Moreover, the position of the third valve 410 can be modulated between the first position and the second position (e.g., to one or more partially open positions) to control the amount of fluid from the primary output conduit 328 that enters the second feedback conduit(s) 322 and, thus, fluid parameters (e.g., a flow rate, a pressure, etc.) of the fluid that is delivered to the second injector 414.

In the illustrated example of FIG. 4A, the first injector 412 and the second injector 414 increase a pressure of the fluid from the first feedback conduit(s) 320 and the second feedback conduit(s) 322, respectively. The first injector 412 and/or the second injector 414 can include a piezoelectric injector, a piezoelectric-hydraulic pump (e.g., that utilizes a piezo stack actuator), an electromagnetic injector (e.g., a solenoid injector), and/or another type of injector that utilizes a reciprocating movement to move and pressurize the fluid. For example, the first injector 412 and/or the second injector 414 can increase the pressure of the fluid from 50 bar to 170 bar. In some examples, the first injector 412 and/or the second injector 414 include one or more valves to control the flow and pressurization of the fluid. In the illustrated example of FIG. 4A, the first injector 412 is coupled to the nozzle 416 at a first inlet of the nozzle 416, and the second injector 414 is coupled to the nozzle 416 at a second inlet of the nozzle 416. More particularly, the first injector 412 includes a first outlet that is aligned with a first inlet of the nozzle 416, and the second injector 414 includes a second outlet that is aligned with a second inlet of the nozzle 416.

In the illustrated example of FIG. 4A, the nozzle 416 mixes (e.g., blends, combines, etc.) the fluid from the first injector 412 with the fluid from the second injector 414. Accordingly, the first injector 412 and the second injector 414 output the fluid at equal pressures to enable the mixing. As such, the first injectors 412, 414 prevent blockage of the fluid from one of the injector(s) 412, 414 and/or backflow. Further, the third feedback conduit(s) 324 are coupled to the nozzle 416 at one or more outlets of the nozzle 416. In the illustrated example of FIG. 4A, the nozzle 416 includes a first outlet that aligns with an opening at an end of the first input 422 of the third feedback conduit(s) 324. Additionally, the nozzle 416 includes a second outlet that aligns with an opening at an end of the second input 424 of the third feedback conduit(s) 324. In some examples, the nozzle 416 includes a single outlet aligned with the third feedback conduit(s) 324.

In the illustrated example of FIG. 4A, the fourth valve(s) 418 and the fifth valve(s) 420 are coupled to the third feedback conduit(s) 324. More particularly, the fourth valve(s) 418 are coupled to the first input 422 and/or the third input 426 of the third feedback conduit(s) 324. Similarly, the fifth valve(s) 420 are coupled to the second input 424 and/or the fourth input 428 of the third feedback conduit(s) 324. The respective inputs 422, 424, 426, 428 of the third feedback conduit(s) 324 deliver the fluid to different areas of the pump 302 or 303. More particularly, the first input 422 and the second input 424 guide the fluid towards a motor of the pump 302 or 303, and the third input 426 and the fourth input 428 guide the fluid towards one or more foil bearings of the pump 302 or 303.

Although the third feedback conduit(s) 324 of the illustrated example include four inputs that deliver the fluid to different areas of the pump, the third feedback conduit(s) 324 may have more or less than four inputs to deliver fluid to the pump 302 or 303 based on a design of the pump 302 or 303 and/or associated thermal management operations that assist the operability of the pump 302 or 303. For example, the third feedback conduit(s) 324 may include a single input to guide the fluid towards a foil bearing or a motor in the pump 302 or 303. Further, the third feedback conduit(s) 324 may include two inputs to guide the fluid towards two separate foil bearings or a single foil bearing and a motor of the pump 302 or 303. In some examples, the pump 302 or 303 includes conduits and/or flowlines that guide the fluid from an input of the third feedback conduit(s) 324 to an area of the pump 302 or 303. Thus, a single input of the third feedback conduit(s) 324 may be associated with (e.g., may contain fluid that is delivered to) more than one area of the pump 302 or 303. As such, it should be understood that the quantity and/or configuration of the input(s) of the third feedback conduit(s) 324 can be configured based on the associated pump 302 or 303.

In the illustrated example of FIG. 4A, the fourth valve(s) 418 are movable between a first position and a second position. When the fourth valve(s) 418 are in the first position, the fourth valve(s) 418 cause the third input 426 to deliver the fluid to the pump 302 or 303 and block the fluid in the third feedback conduit(s) 324 from entering the pump 302 or 303 via the first input 422. When the fourth valve(s) 418 are in the second position, the fourth valve(s) 418 cause the first input 422 to deliver the fluid to the pump 302 or 303 and block the fluid in the third feedback conduit(s) 324 from flowing through the third input 426.

The fifth valve(s) 420 is similarly movable between a first position and a second position. When the fifth valve(s) 420 are in the first position, the fifth valve(s) 420 cause the fourth input 428 to deliver the fluid to the pump 302 or 303 and block the fluid in the third feedback conduit(s) 324 from entering the pump 302 or 303 via the second input 422. When the fifth valve(s) 420 are in the second position, the fifth valve(s) 420 cause the second input 424 to deliver the fluid to the pump 302 or 303 and block the fluid in the third feedback conduit(s) 324 from flowing through the fourth input 428.

In the illustrated example of FIG. 4A, the control circuitry 336 is operatively coupled (e.g., electrically coupled, pneumatically coupled, hydraulically coupled, etc.) to the first valve 402, the accumulator 404, the heater 408, the second valve 406, the third valve 410, the first injector 412, the second injector 414, the fourth valve(s) 418, and the fifth valve(s) 420. The control circuitry 336 controls the first valve 402, the accumulator 404, the heater 408, the second valve 406, the third valve 410, the first injector 412, the second injector 414, the fourth valve(s) 418, and/or the fifth valve(s) 420 based on measurements from the sensors 338 (e.g., a temperature and/or a pressure of the fluid in the thermal transport bus 304) and/or a state of operations in the thermal management system 300, 350 (e.g., pre-start operations and/or normal operations).

In the illustrated example of FIG. 4A, the control circuitry 336 determines whether and/or how much of the fluid in the thermal transport bus 304 and/or the pump 302 or 303 is in the liquid state based on the measurements from the sensors 338. When the fluid in the thermal transport bus 304 and/or the pump 302 or 303 does not satisfy a liquid threshold, the control circuitry 336 causes the thermal control system 400 to perform the pre-start operations before initiating operations of the pump 302 or 303. During the pre-start operations, the control circuitry 336 causes the thermal control system 400 to inject pressurized and/or heated fluid into the pump 302 or 303. More particularly, the control circuitry 336 can control the respective positions of the first valve 402 and/or the third valve 410 to control whether and/or how much of the fluid from the primary input conduit 326 and/or the primary output conduit 328 enters the first feedback conduit 320 and/or the second feedback conduit 322, respectively. In some examples, the control circuitry 336 determines a position for the first valve 402 and/or the third valve 410 based on the temperature and/or the pressure of the fluid. In some examples, the control circuitry 336 determines a rate at which fluid from the accumulator 404 is to enter the first feedback conduit(s) 320 based on the amount of fluid in the accumulator 404, the temperature and/or the pressure of the fluid in the thermal transport bus 304 and/or the pump 302 or 303, and/or parameters associated with foil bearings in the pump 302 or 303 (e.g., a size, a quantity, a design, etc.). In such examples, the control circuitry 336 controls the accumulator 404 and/or the second valve 406 based on the determined rate at which fluid from the accumulator is to enter into the first feedback conduit(s) 320. In some examples, the control circuitry 336 determines a pressure increase to cause the fluid in the pump 302 or 303 and/or the thermal transport bus 304 to satisfy the liquid threshold. In some such examples, the control circuitry 336 determines an amount of fluid to be supplied to the first injector 412, the second injector 414, and/or to the pump 302 or 303 based on the determined pressure increase. The control circuitry 336 can control the respective positions of the first valve 402, the second valve 406, and/or the third valve 410 based on the determined amount of fluid.

In the illustrated example of FIG. 4A, the control circuitry 336 determines whether to activate the heater 408 based on the temperature and/or the pressure of the fluid in the thermal transport bus 304 and/or the pump 302 or 303. For example, the control circuitry 336 can determine whether a pressure increase (e.g., a maximum pressure increase) that is providable by the first injector 412 and the second injector 414 will cause the fluid in the thermal transport bus 304 and/or the pump 302 or 303 to satisfy the liquid threshold within a threshold period of time (e.g., 10 seconds, 20 seconds, etc.). In such examples, when the providable pressure increase will not cause the fluid in the thermal transport bus 304 and/or the pump 302 or 303 to satisfy the liquid threshold within the threshold period of time, the control circuitry 336 activates the heater 408. As a result, the heater 408 generates heat that is absorbed by the fluid in the first feedback conduit(s) 320 upstream of the first injector 412. Accordingly, the temperature increase provided by the heater 408 in addition to the pressure increase provided by the first injector 412 and/or the second injector 414 can increase the temperature and/or the pressure of the fluid in the pump 302 or 303, which causes the fluid in the pump 302 or 303 to be in the gaseous and/or supercritical state. In some examples, when the control circuitry 336 determines that the heater 408 is to be utilized during the pre-start operations, the control circuitry 336 prevents mixing of the heated fluid from the first feedback conduit(s) 320 with the cooler fluid from the second feedback conduit(s) 322, as discussed further in association with FIG. 4F.

In the illustrated example of FIG. 4A, the first injector 412 and the second injector 414 increase the pressure of the fluid from the first feedback conduit(s) 320 and the second feedback conduit(s) 322, respectively, and output the fluid into the nozzle 416. The nozzle 416 causes the fluid from the first and second injectors 412, 414 to mix before entering the third feedback conduit(s) 324. As such, when the heater 408 is activated, the nozzle 416 enables the heated fluid from the first feedback conduit(s) 320 to heat the fluid from the second feedback conduit(s) 322. In the illustrated example, the nozzle 416 outputs the pressurized and/or heated fluid into the first and second inputs 422, 424 of the third feedback conduit(s) 324. In some examples, the nozzle 416 outputs the fluid into a single input of the third feedback conduit(s) 324. In such examples, the third feedback conduit(s) 324 may define (e.g., split into) separate inputs downstream of the nozzle 416 or may have the single input coupled to the pump 302 or 303.

In the illustrated example of FIG. 4A, the control circuitry 336 controls the respective positions of the fourth valve(s) 418 and the fifth valve(s) 420 to direct the fluid towards foil bearings of the pump 302 or 303 during pre-start operations. More particularly, the control circuitry 336 causes the fourth valve(s) 418 to be in the associated first position to cause the pressurized and/or heated fluid to enter the pump 302 or 303 via the third input 426 while blocking the fluid in the third feedback conduit(s) 324 from entering the pump 302 or 303 via the first input 422. Similarly, the control circuitry 336 causes the fifth valve(s) 420 to be in the associated first position to cause the pressurized and/or heated fluid to enter the pump 302 or 303 via the fourth input 428 while blocking the fluid in the third feedback conduit(s) 324 from entering the pump 302 or 303 via the second input 424.

As such, the control circuitry 336 causes the valves 418, 420 to guide the pressurized and/or heated fluid towards the foil bearing(s) of the pump 302 or 303 during the pre-start operations. In turn, the pressurized and/or heated fluid can move fluid that is in the liquid state out of and/or away from the foil bearing(s) and/or cause the fluid in the pump 302 or 303 that is in the liquid state to convert to a gaseous and/or supercritical state. Thus, the injection of the pressurized and/or heated fluid into the pump 302 or 303 enables the foil bearing(s) to support a rotating component within the pump 302 or 303 while preventing wear and/or hindered functionality that would otherwise result from the windage loss, the film thickness/stiffness, etc. that the foil bearing(s) encounter operating with the fluid in the liquid state. In some examples, the control circuitry 336 causes the pre-start operations to be performed for a predetermined period of time (e.g., 1 minute, 2 minutes, etc.) based on the temperature and/or the pressure of the fluid at a beginning of the pre-start operations. For example, the control circuitry 336 can determine the amount of time that the thermal control system 400 will take to cause the fluid in the pump 302 or 303 and/or the thermal transport bus 304 to reach the desired state based on the initial temperature and/or pressure of the fluid. In some examples, the control circuitry 336 monitors the pressure and/or the temperature measurements from the sensors 338 and switches from the pre-start operations to normal operations when the fluid in the pump 302 or 303 and/or the thermal transport bus 304 satisfies the liquid threshold.

When the normal operations are to begin, the control circuitry 336 controls the pump 302 or 303 (e.g., transmits a drive signal to the pump 302 or 303) to cause the pump 302 or 303 to drive the fluid through the thermal transport bus 304. During the normal operations, the thermal control system 400 operates to cool or maintain a temperature of the motor of the pump 302 or 303. Accordingly, if the heater 408 was activated during the pre-start operations, the control circuitry 336 deactivates the heater 408. Further, the control circuitry 336 controls the respective positions of the valves 402, 406, 410 to control fluid parameters (e.g., temperature, pressure, flow rate, etc.) of the fluid that is injected into the third feedback conduit(s) 324. More particularly, as a result of the operations of the pump 302 or 303, the fluid in the primary output conduit 328 can have a higher temperature than the fluid in the primary input conduit 326. Additionally, the fluid in the accumulator 404 is cooler than both the fluid from the primary output conduit 328 and the fluid from the primary input conduit 326. The control circuitry 336 utilizes the cooler fluid from the accumulator 404 to cool the fluid from the primary output conduit 328 and the fluid from the primary input conduit 326. For example, the control circuitry 336 can adjust a position of the first valve 402 and/or the second valve 406 to control a ratio of the fluid in the first feedback conduit(s) 320 from the primary input conduit 326 to the fluid in the first feedback conduit(s) 320 from the accumulator 404. For example, the control circuitry 336 can cause the fluid from the accumulator 404 to form a first percentage of the fluid in the first feedback conduit(s) 320 during pre-start operations and a second percentage that is less than the first percentage during normal operations. As a result, the control circuitry 336 can control a temperature of the fluid in the first feedback conduit(s) 320. Additionally, the control circuitry 336 can control a position of the third valve 410 to control how much fluid from the primary output conduit 328 mixes with the cooler fluid from the first feedback conduit(s) in the nozzle 416 and/or the third feedback conduit(s) 324. Thus, the control circuitry 336 can control a temperature of the fluid in the third feedback conduit(s) 324. Moreover, the cooling that originated from the fluid of the accumulator 404 spreads across the fluid that entered the thermal control system 400 from the primary input conduit 326 and the primary output conduit 328 before the fluid enters the pump 302 or 303. As a result, the cooling effect provided by the fluid can be distributed across a larger volume in the pump 302 or 303 compared to if only the fluid from the accumulator 404 were to be injected into the pump 302 or 303.

As such, the control circuitry 336 controls the respective positions of the valves 402, 406, 410 to control the temperature of the fluid provided to the third feedback conduit(s) 324. In some examples, the control circuitry 336 determines the position of the second valve 406 based on a duration for which the thermal management system 300, 350 is to be utilized and, thus, a period that the thermal control system 400 needs to support operations of the pump 302 or 303. Specifically, because the accumulator 404 has a limited volume, the control circuitry 336 can control the second valve 406 to ration the usage of the fluid in the accumulator 404. For example, the control circuitry 336 can associate certain positions of the second valve 406 with certain temperature thresholds such that the usage of the fluid from the accumulator 404 is proportionate with the need for cooling in the pump 302 or 303.

Furthermore, during the normal operations, the control circuitry 336 can control the output pressure and/or flow rate provided by the injectors 412, 414 based on the pressure and/or the temperature of the fluid in the pump 302 or 303 and/or the thermal transport bus 304. In turn, the relatively cooler fluid from the first feedback conduit(s) 320 mixes with the relatively warmer fluid from the second feedback conduit(s) 322 in the nozzle 416 such that the relatively cooler fluid can reduce a temperature of the relatively warmer fluid. Moreover, during the normal operations, the control circuitry 336 adjusts the positions of the fourth valve(s) 418 and the fifth valve(s) 420 to the respective second positions. As a result, the third feedback conduit(s) 324 convey the cooled fluid to the pump 302 or 303 via the first input 422 and the second input 424. Thus, the cooled fluid can cool the fluid and/or components in the pump 302 or 303 to maintain an operability of the pump 302 or 303, such as by reducing vibrations induced by hot fluid (e.g., fluid having a temperature over 400° F.) in the pump 302 or 303 and preventing the motor of the pump 302 or 303 from overheating.

Figure 4B:
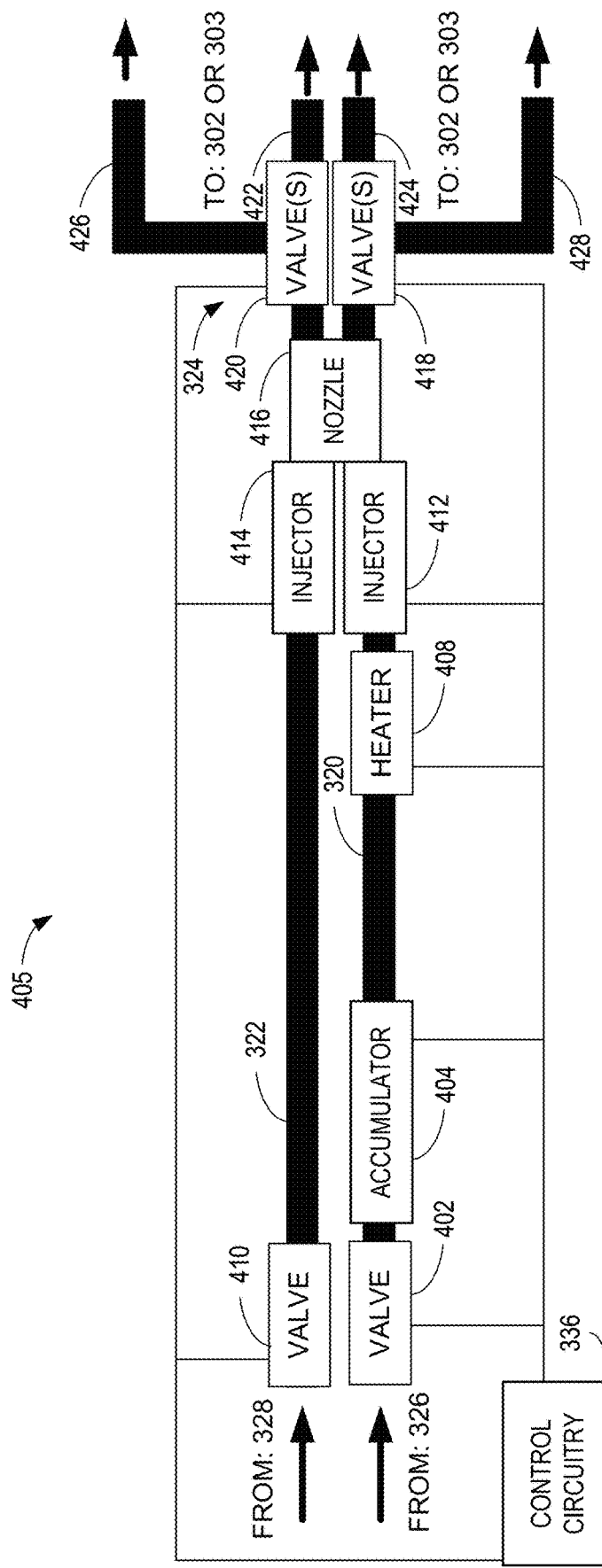
FIG. 4B is a second schematic diagram of an example thermal control system of the example thermal management system of FIGS. 3A and/or 3B.

FIG. 4B is a schematic representative of a second example thermal control system 405 (e.g., a second example implementation of the thermal control system(s) 316 of FIGS. 3A-3B). In the illustrated example of FIG. 4B, the thermal control system 405 includes the first valve 402, the accumulator 404, the heater 408, the third valve 410, the first injector 412, the second injector 414, the nozzle 416, the fourth valve(s) 418, and the fifth valve(s) 420. The thermal control system 405 also includes the first feedback conduit(s) 320, the second feedback conduit(s) 322, and the third feedback conduit(s) 324 including the first input 422, the second input 424, the third input 426, and the fourth input 428. In the illustrated example of FIG. 4B, the thermal control system 405 does not include the second valve 406 (FIG. 4A) associated with the accumulator 404, but otherwise functions similar to the example thermal control system 400 of FIG. 4A. In FIG. 4B, the control circuitry 336 controls the rate at which the fluid from the accumulator 404 enters the first feedback conduit(s) 320 via the position of the first valve 402 and the pressure difference generated by the first injector 412.

Figure 4C:
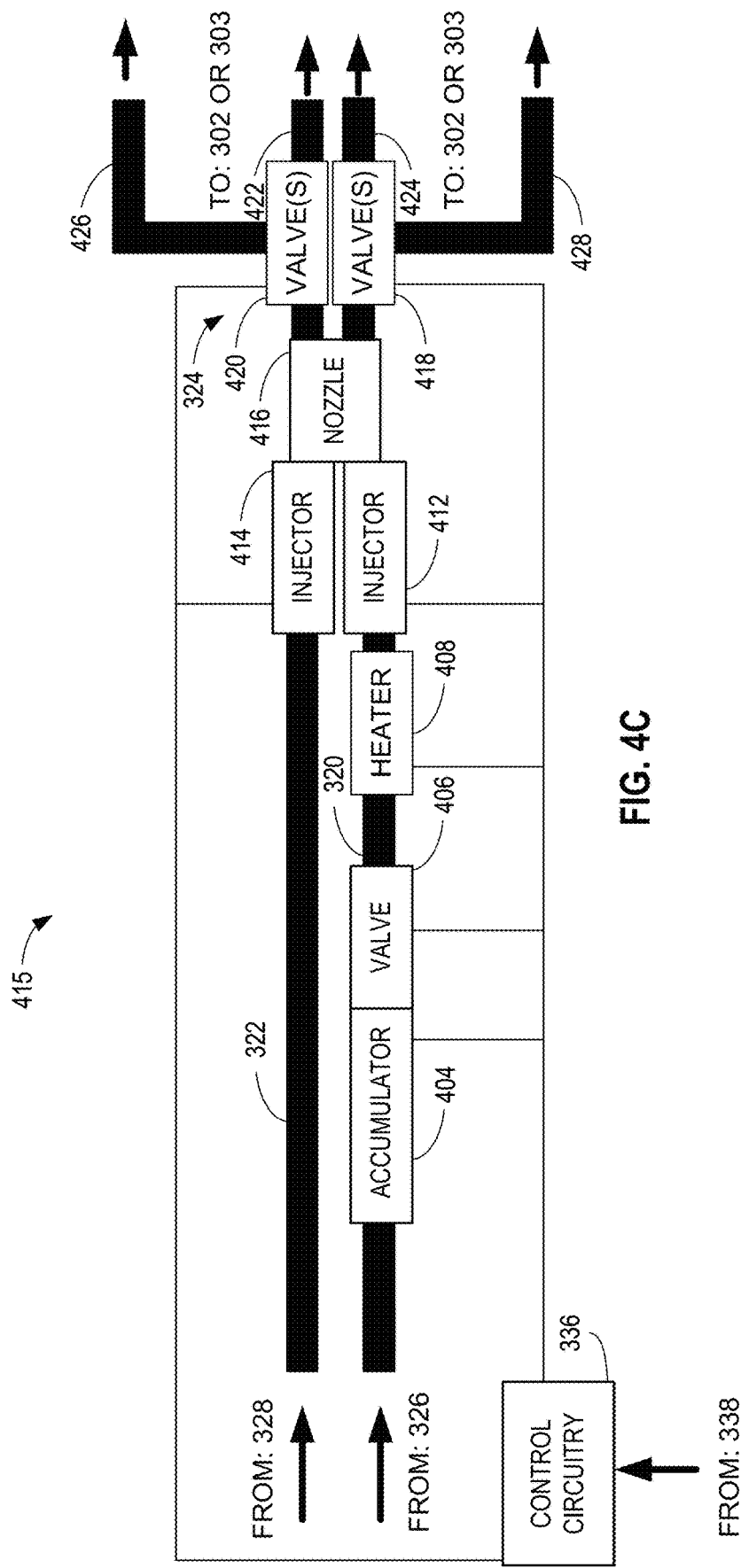
FIG. 4C is a third schematic diagram of an example thermal control system of the example thermal management system of FIGS. 3A and/or 3B.

FIG. 4C is a schematic representative of a third example thermal control system 415 (e.g., a third example implementation of the thermal control system(s) 316 of FIGS. 3A-3B). In the illustrated example of FIG. 4C, the thermal control system 415 includes the accumulator 404, the second valve 406, the heater 408, the first injector 412, the second injector 414, the nozzle 416, the fourth valve(s) 418, and the fifth valve(s) 420. The thermal control system 415 also includes the first feedback conduit(s) 320, the second feedback conduit(s) 322, and the third feedback conduit(s) 324 including the first input 422, the second input 424, the third input 426, and the fourth input 428. In the illustrated example of FIG. 4C, the thermal control system 405 does not include the first valve 402 (FIGS. 4A and 4B) nor the third valve 410 (FIGS. 4A and 4B). In FIG. 4C, the control circuitry 336 controls the flow rate of the fluid that the thermal control system 415 pulls from the primary input conduit 326 and the primary output conduit 328 via the first injector 412 and the second injector 414, respectively. More particularly, the injectors 412, 414 form a pressure difference that pulls fluid through the first feedback conduit(s) 320 and the second feedback conduit(s) 322, respectively. In FIG. 4C, the control circuitry 336 controls the formed pressure differences to control the rate at which the fluid from the primary input conduit 326 enters the first feedback conduit(s) 320 and the rate at which the fluid from the primary output conduit 328 enters the second feedback conduit(s) 322. Moreover, the control circuitry 336 can adjust the pressure differences that the injectors 412, 414 form based on operations of the thermal management system 300, 350 and/or a pressure and/or temperature of the fluid in the pump 302 or 303 and/or the thermal transport bus 304.

Figure 4D:
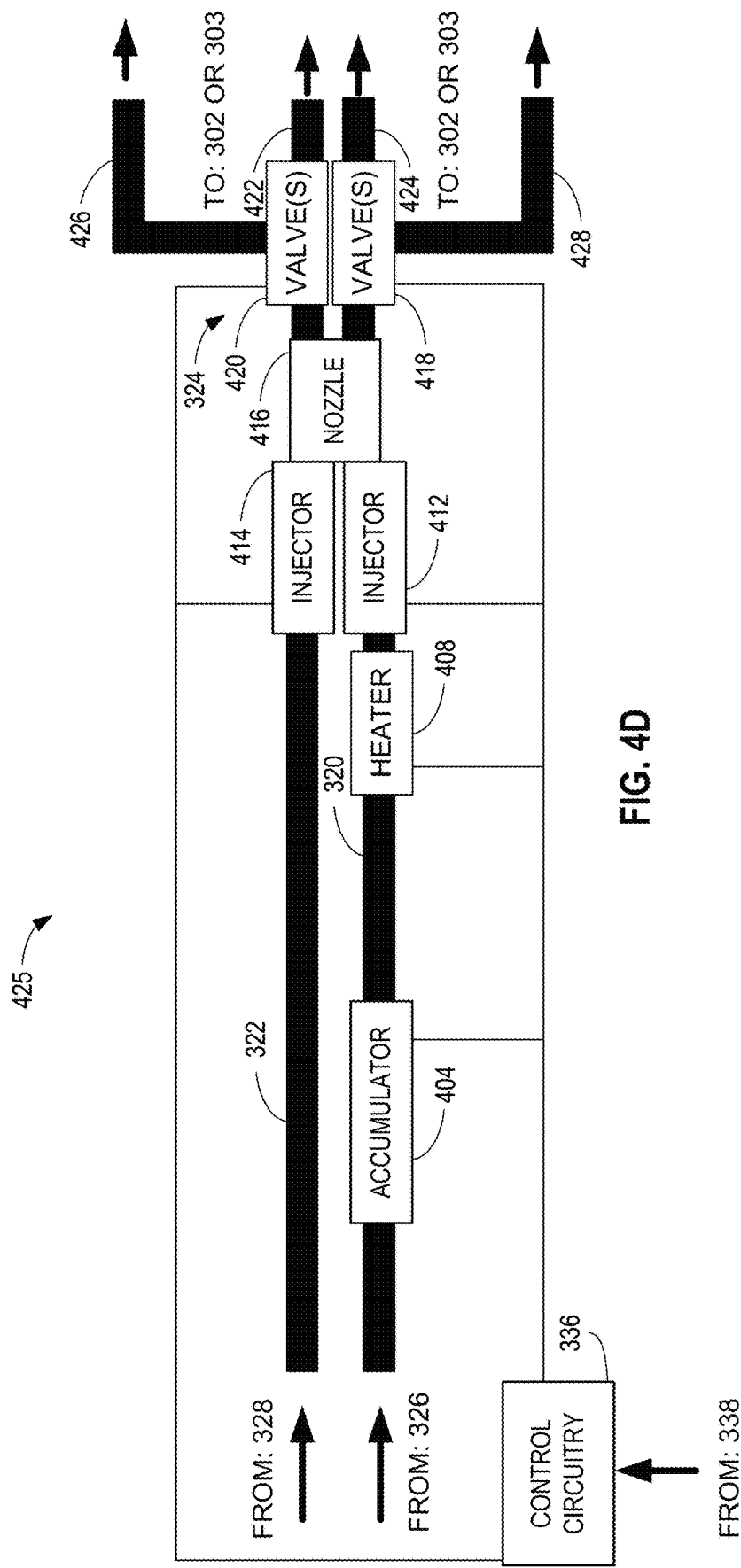
FIG. 4D is a fourth schematic diagram of an example thermal control system of the example thermal management system of FIGS. 3A and/or 3B.

FIG. 4D is a schematic representative of a fourth example thermal control system 425 (e.g., a fourth example implementation of the thermal control system(s) 316 of FIGS. 3A-3B). In the illustrated example of FIG. 4D, the thermal control system 425 includes the accumulator 404, the heater 408, the first injector 412, the second injector 414, the nozzle 416, the fourth valve(s) 418, and the fifth valve(s) 420. The thermal control system 425 also includes the first feedback conduit(s) 320, the second feedback conduit(s) 322, and the third feedback conduit(s) 324 including the first input 422, the second input 424, the third input 426, and the fourth input 428. In the illustrated example of FIG. 4D, the thermal control system 405 does not include the first valve 402 (FIGS. 4A and 4B), the second valve 406 (FIGS. 4A and 4C), nor the third valve 410 (FIGS. 4A and 4B). In FIG. 4D, the injectors 412, 414 control the rate at which fluid enters the first feedback conduit(s) 320 and/or the second feedback conduit(s) 322 from the primary input conduit 326, the accumulator 404, and the primary output conduit 328. In some examples, the accumulator 404 is configured to constantly release fluid into the first feedback conduit(s) 320 and the pressure difference created by the first injector 412 controls the rate at which the fluid exits the accumulator 404. In some examples, the first injector 412 pulls the fluid from the accumulator 404 into the first feedback conduit(s) 320 by forming a pressure difference that satisfies a pressure difference threshold. For example, the accumulator 404 can include a check valve that prevents the fluid in the accumulator from exiting. Further, when the first injector 412 satisfies the pressure difference threshold, the check valve can open and the fluid from the accumulator 404 can enter the first feedback conduit(s) 320. As such, the control circuitry 336 controls the pressure difference formed by the first injector 412 to control whether and/or a rate at which the fluid from the accumulator 404 enters the first feedback conduit(s) 320.

Figure 4E:
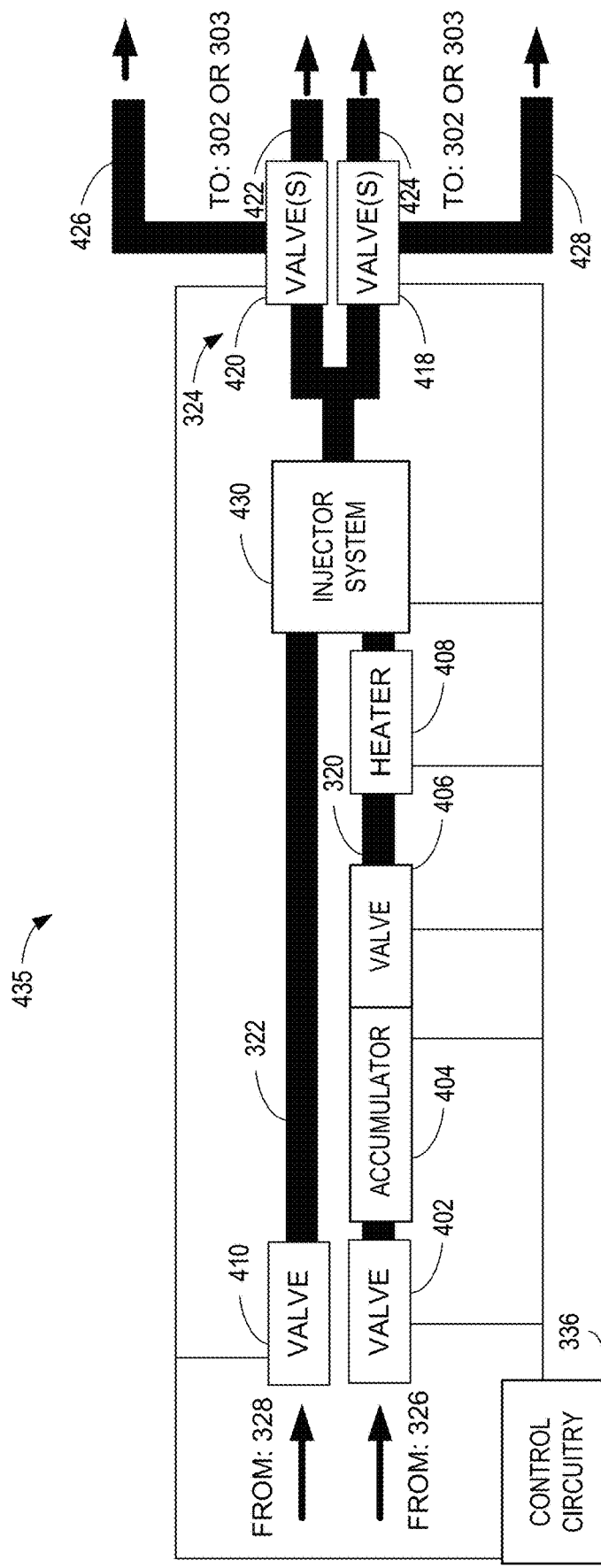
FIG. 4E is a fifth schematic diagram of an example thermal control system of the example thermal management system of FIGS. 3A and/or 3B.

FIG. 4E is a schematic representative of a fifth example thermal control system 435 (e.g., a fifth example implementation of the thermal control system(s) 316 of FIGS. 3A-3B). In the illustrated example of FIG. 4E, the thermal control system 435 includes the first valve 402, the accumulator 404, the second valve 406, the heater 408, the third valve 410, the fourth valve(s) 418, and the fifth valve(s) 420. The thermal control system 435 also includes the first feedback conduit(s) 320, the second feedback conduit(s) 322, and the third feedback conduit(s) 324 including the first input 422, the second input 424, the third input 426, and the fourth input 428. In the illustrated example of FIG. 4E, the thermal control system 435 includes an injector system 430 (e.g., a system of one or more injector(s)) coupled to the first feedback conduit(s) 320, the second feedback conduit(s) 322, and the third feedback conduit(s) 324. The control circuitry 336 is operatively coupled to the injector system 430. The injector system 430 includes a first inlet aligned with the opening at the second end of the first feedback conduit(s) 320. Additionally, the injector system 430 includes a second inlet aligned with the opening at the second end of the second feedback conduit(s) 322.

In the illustrated example of FIG. 4E, when the pressure of the fluid in the first feedback conduit(s) 320 and the pressure of the fluid in the second feedback conduit(s) 322 are approximately equal, the injector system 430 can include a single injector that receives and pressurizes the fluid from the first feedback conduit(s) 320 and the fluid from the second feedback conduit(s) 322 together. In some examples, the control circuitry 336 controls the respective positions of the first and third valves 402, 410, to enable the fluid pressure at the first inlet and the second inlet of the injector system 430 to be approximately equivalent. As a result, the fluid from the first feedback conduit(s) 320 and the fluid from the second feedback conduit(s) 322 can mix in the injector system 430 as the associated injector(s) increase a pressure of the fluid.

In the illustrated example of FIG. 4E, when the pressure of the fluid in the first feedback conduit(s) 320 and the pressure of the fluid in the second feedback conduit(s) 322 are not approximately equivalent and the respective positions of the first and third valves 402, 410 cannot be configured to equalize the pressure, the injector system 430 includes a first injector at the first inlet (e.g., the first injector 412 (FIGS. 4A-4D)) and/or a second injector at the second inlet (e.g., the second injector 414 (FIGS. 4A-4D)). The injector(s) at the first inlet and/or the second inlet can increase the pressure of the fluid from the first feedback conduit(s) 320 and/or the second feedback conduit(s) 322 to cause the pressure of the fluid from the first feedback conduit(s) 320 to be approximately equivalent to the pressure of the fluid from the second feedback conduit(s) 322. Thus, the fluid from the first feedback conduit(s) 320 can mix with the fluid from the second feedback conduit(s) downstream of the first and/or second injectors.

In some examples, the fluid from the first feedback conduit(s) 320 mixes with the fluid from the second feedback conduit(s) 322 in a third injector downstream of the first injector and/or the second injector and/or in a mixing chamber or conduit upstream of the third injector. In such examples, the third injector can further increase the pressure of the fluid from the first feedback conduit(s) 320 and the second feedback conduit(s) 322. The injector system 430 can include one or more additional injector(s) downstream of the third injector to further increase the pressure of the fluid. For example, the quantity of injectors within the injector system 430 can depend on the pressure increase provided by the respective injectors and the desired pressure increase. Further, the injector system 430 may include injectors positioned in parallel similar to the first and second injectors 412, 414 of FIGS. 4A-4D. In the illustrated example of FIG. 4E, the injector system 430 includes a single outlet that is aligned with an opening at an end of the third feedback conduit(s) 324. In some examples, the injector system 430 includes more than one outlet, similar to the nozzle 416 of FIGS. 4A-4D.

Figure 4F:
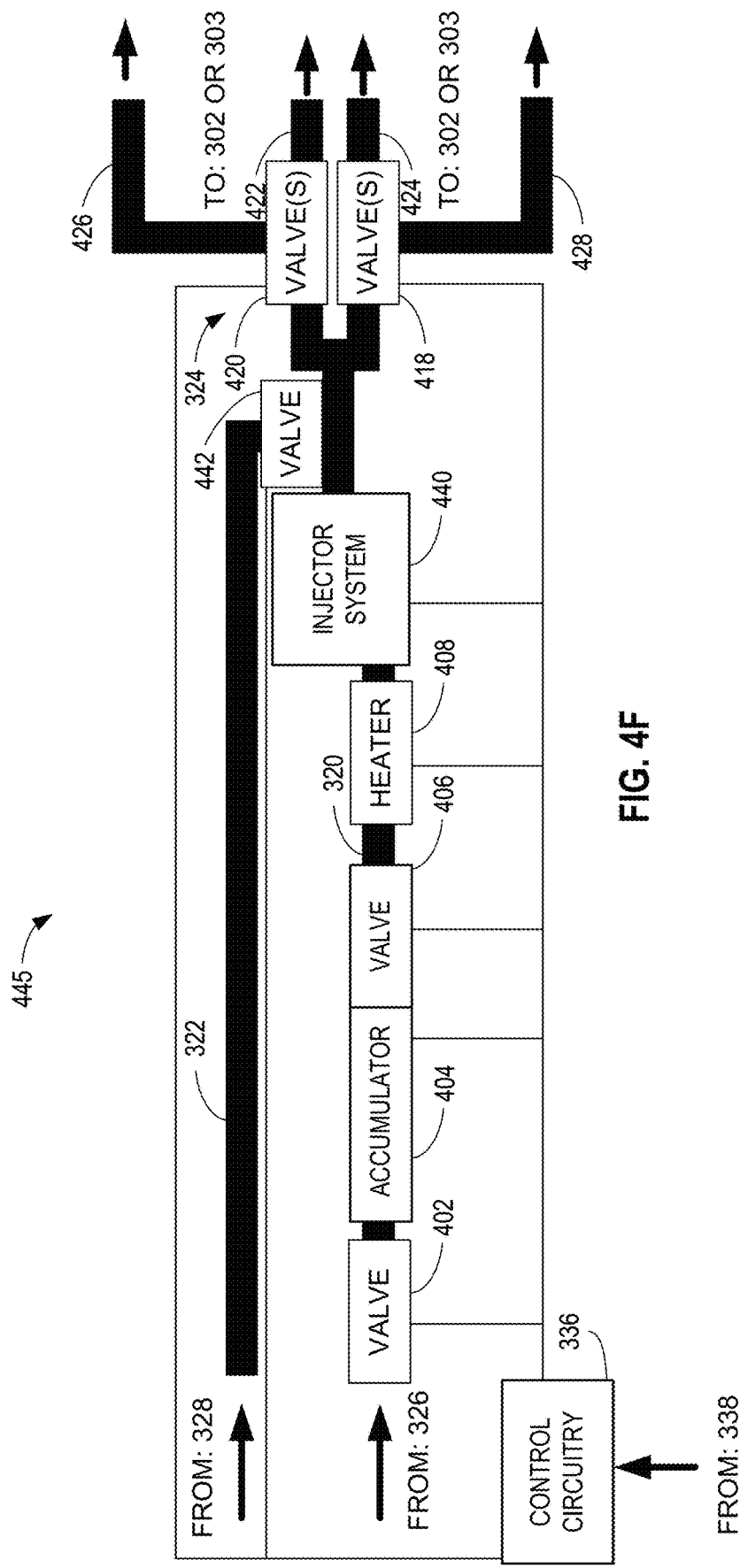
FIG. 4F is a sixth schematic diagram of an example thermal control system of the example thermal management system of FIGS. 3A and/or 3B.

FIG. 4F is a schematic representative of a sixth example thermal control system 445 (e.g., a sixth example implementation of the thermal control system(s) 316 of FIGS. 3A-3B). In the illustrated example of FIG. 4F, the thermal control system 445 includes the first valve 402, the accumulator 404, the second valve 406, the heater 408, the fourth valve(s) 418, and the fifth valve(s) 420. The thermal control system 445 also includes the first feedback conduit(s) 320, the second feedback conduit(s) 322, and the third feedback conduit(s) 324 including the first input 422, the second input 424, the third input 426, and the fourth input 428. In the illustrated example of FIG. 4F, the thermal control system 445 includes another injector system 440 (e.g., a system of one or more injectors) and a sixth valve 442. The control circuitry 336 is operatively coupled to the sixth valve 442 and the injector system 440.

In the illustrated example of FIG. 4F, the second feedback conduit(s) 322 are coupled to the third feedback conduit(s) 324. More particularly, an opening at the second end of the second feedback conduit(s) 322 is aligned with an opening in the third feedback conduit(s) 324 such that the second feedback conduit(s) 322 are directly fluidly coupled to the third feedback conduit(s) 324. In FIG. 4F, the sixth valve 442 is coupled to the second end of the second feedback conduit(s) 322 and/or the third feedback conduit(s) 324. A position of the sixth valve 442 controls whether and/or how much fluid from the second feedback conduit(s) 322 flows into the third feedback conduit(s) 324. For example, a first position (e.g., an open position) of the sixth valve 442 causes at least a portion of the fluid in the second feedback conduit(s) 322 to flow into the third feedback conduit(s) 324. Further, a second position (e.g., a closed position) of the sixth valve 442 blocks the fluid from flowing between the second and third feedback conduit(s) 322, 324. Moreover, the position of the sixth valve 442 can be modulated between the first position and the second position (e.g., to one or more partially open positions) to control the amount of fluid from the second feedback conduit(s) 322 that enters the third feedback conduit(s) 324.

In the illustrated example of FIG. 4F, the injector system 440 is coupled to the first feedback conduit(s) 320 and the third feedback conduit(s) 324. More particularly, the injector system 440 includes an inlet aligned with the opening at the second end of the first feedback conduit(s) 320 and an outlet aligned with an opening at an end of the third feedback conduit(s) 324. The injector system 440 can include one or more injectors (e.g., one or more of the first injector 412 and/or the second injector 414). In some examples, the injector system 440 includes a single injector (e.g., the first injector 412, the second injector 414, etc.) to increase a pressure of the fluid between the first feedback conduit(s) 320 and the third feedback conduit(s) 324. In some examples, the injector system 440 includes more than one injector in series to increase the pressure of the fluid that the injector system 440 outputs into the third feedback conduit(s) 324. In some examples, a configuration of the injector system 440 (e.g., a quantity of the first injector 412 and/or the second injector 414, a layout of the injector(s), a type of the injector(s), etc.) is based on a desired pressure increase and a pressure increase providable by the type of injector(s) included in the injector system 440.

In the illustrated example of FIG. 4F, the control circuitry 336 controls operations of the injector system 440 and the sixth valve 442 based on the temperature and/or the pressure of the fluid in the pump 302 or 303 and/or the thermal transport bus 304. For example, during the pre-start operations, the control circuitry 336 causes the sixth valve 442 to be in the associated second position to prevent the pressurized fluid in the third feedback conduit(s) 324 from flowing into the second feedback conduit(s) 322. Further, the control circuitry 336 can adjust the sixth valve to the associated first position, or a modulated position, when the pressure in the third feedback conduit(s) 324 is approximately equivalent to the pressure in the second feedback conduit(s) 322.

In the illustrated example of FIG. 4F, during the pre-start operations, the control circuitry 336 controls the injector system 440 based on the desired pressure increase between the first feedback conduit(s) 320 and the third feedback conduit(s) 324. In some examples, when the injector system 440 includes more than one injector in series, the control circuitry 336 controls the injectors separately. For example, the injector system 440 can include two injectors in series. In such examples, when a higher pressure increase is desired, the control circuitry 336 can activate both injectors of the injector system 440, and, when a lower pressure increase is desired, the control circuitry 336 can cause one of the injectors to increase the pressure while causing the other injector to passively allow the fluid to pass through. During normal operations, the control circuitry 336 can cause the injector system 440 to minimize the pressure increase of the fluid to reduce the temperature increase that accompanies the pressure increase. In some examples, during normal operations, the control circuitry 336 causes the injector system 440 to output a pressure that is approximately equivalent to the fluid in the second feedback conduit(s) 322. In such examples, the control circuitry 336 opens the sixth valve 442 to cause the fluid from the second feedback conduit(s) 322 to mix with the fluid from the injector system 440 in the third feedback conduit(s) 324.

Figure 4G:
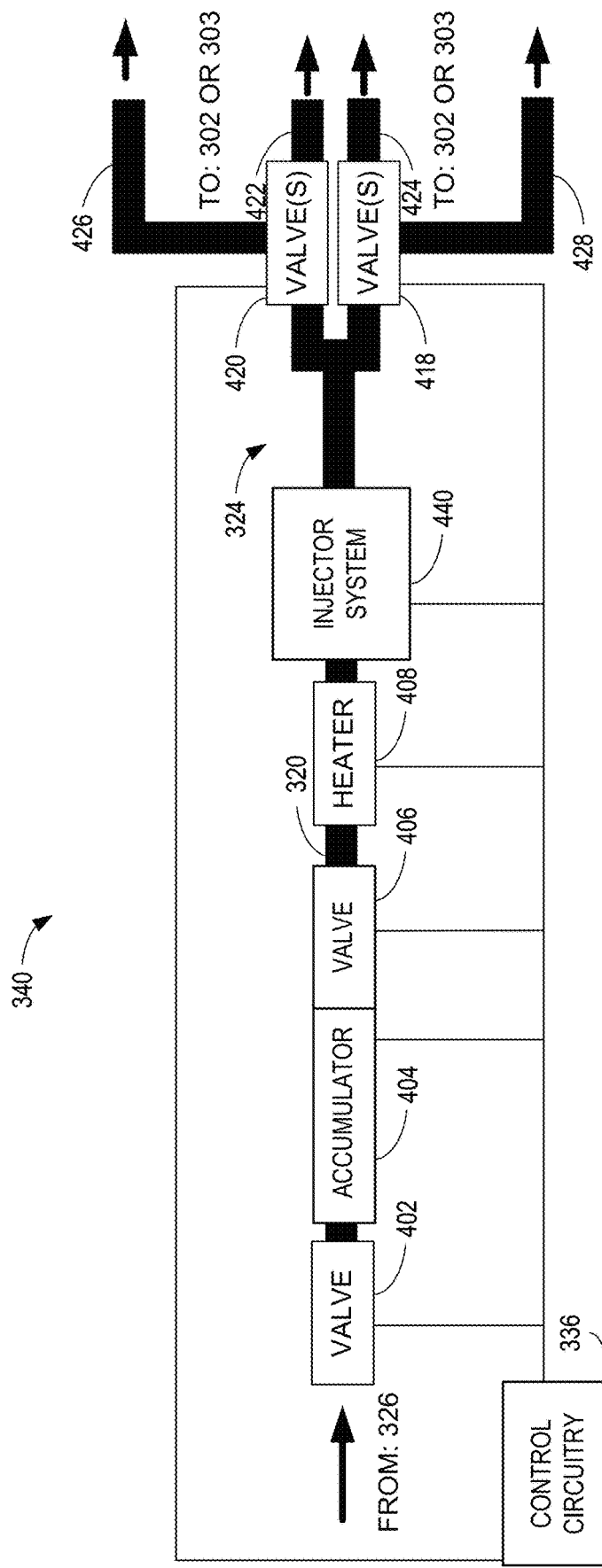
FIG. 4G is a seventh schematic diagram of an example thermal control system of the example thermal management system of FIGS. 3A and/or 3B.

FIG. 4G is a schematic representative of the thermal control system 340 of FIGS. 3C and/or 3D. In the illustrated example of FIG. 4G, the thermal control system includes the first feedback conduit(s) 320, the third feedback conduit(s) 324, the control circuitry 336, the first valve 402, the accumulator 404, the second valve 406, the heater 408, the injector system 440, the fourth valve(s) 418, the fifth valve(s) 420, the first input 422, the second input 424, the third input 426, and the fourth input 428. During the pre-start operations, the control circuitry 336 controls the first valve 402, the accumulator 404, the second valve 406, the heater 408, the injector system 440, the fourth valve(s) 418, and/or the fifth valve(s) 420 to increase a pressure and/or a temperature of the fluid in the pump 303. During the normal operations, the control circuitry 336 controls the first valve 402, the accumulator 404, the second valve 406, the heater 408, the injector system 440, the fourth valve(s) 418, and/or the fifth valve(s) 420 to maintain a temperature of the fluid in the pump 303 below a temperature threshold (e.g., 400° F.).

The foregoing examples of the thermal control systems can be used with fluid transport systems. Although each example thermal control system disclosed above has certain features, it should be understood that it is not necessary for a particular feature of one example thermal control system to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features.

Figure 5:
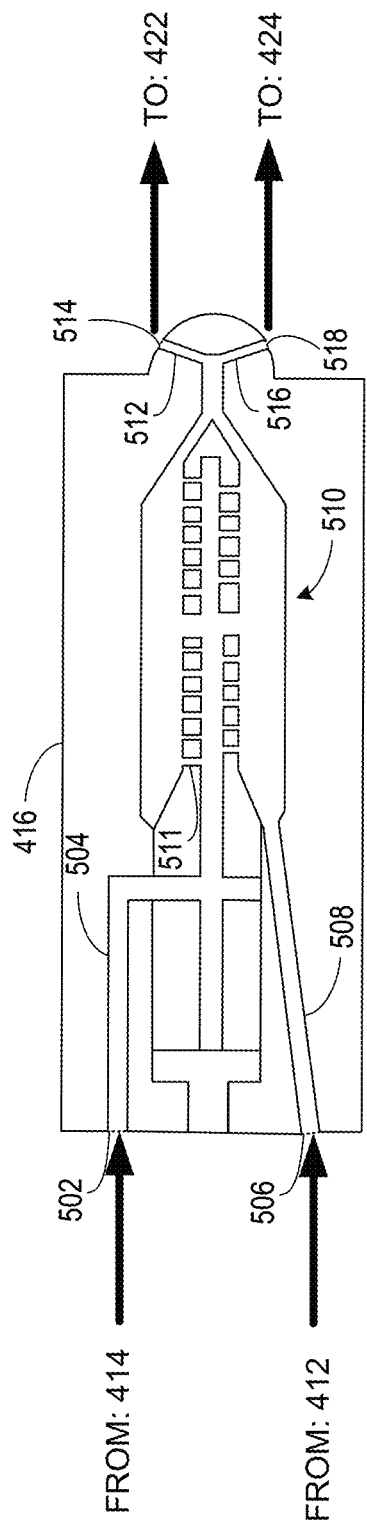
FIG. 5 is a schematic illustration of an example nozzle of the example thermal control systems of FIGS. 4A, 4B, 4C, and/or 4D.

FIG. 5 is a schematic illustration of the nozzle 416 of the example thermal control systems 400, 405, 415, 425 of FIGS. 4A, 4B, 4C, and/or 4D. In the illustrated example of FIG. 5, the nozzle 416 includes a first inlet 502, a first conduit 504, a second inlet 506, a second conduit 508, a mixing chamber 510, a third conduit 512, a first outlet 514, a fourth conduit 516, and a second outlet 518. The first inlet 502 is defined at an end of the first conduit 504 and receives fluid from the second injector 414. The second inlet 506 is defined at an end of the second conduit 508 and receives fluid from the first injector 412. The fluid from the first injector 412 mixes with the fluid from the second injector 414 in the mixing chamber 510. More particularly, the nozzle 416 includes mixing conduits 511 that carry the fluid from the first conduit 504 into the mixing chamber 510 where the fluid from the first conduit 504 mixes with the fluid from the second conduit 508. The mixing conduits 511 can be staggered on opposite sides of the first conduit 504 and/or have different cross-sectional areas to help the fluids mix in the mixing chamber 510. In some examples, the cross-sectional area of the mixing conduits 511 can help control a size of the fluid particles that enter the mixing chamber 510 to help the fluids mix efficiently.

After mixing, a first portion of the fluid flows into the first input 422 of the third feedback conduit(s) 324, and a second portion of the fluid flows into the second input 424 of the third feedback conduit(s) 324. Specifically, the first portion of the fluid flows through the third conduit 512 and the first outlet 514 defined at the end of the third conduit 512. Similarly, the second portion of the fluid flows through the fourth conduit 516 and the second outlet 518, which is defined at the end of the fourth conduit 516. Thus, the nozzle 416 mixes the fluid from the first injector 412 with the fluid from the second injector 414 to distribute the heat across the fluid before delivering the fluid to the third feedback conduit(s) 324.

Figure 6A:
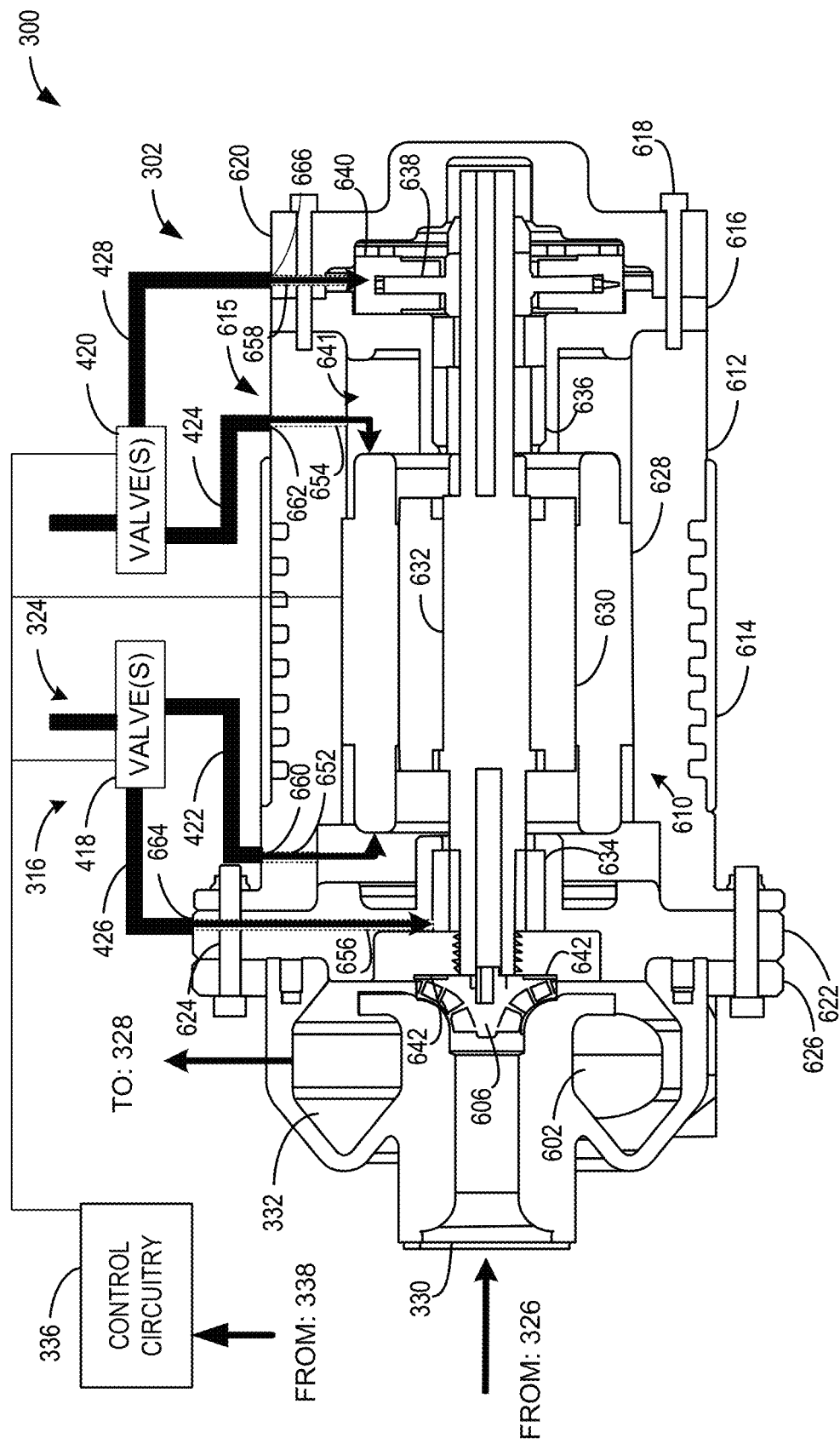
FIG. 6A is a schematic illustration of a first example thermal transport bus pump of the example thermal management system of FIG. 3A.
Figure 6B:
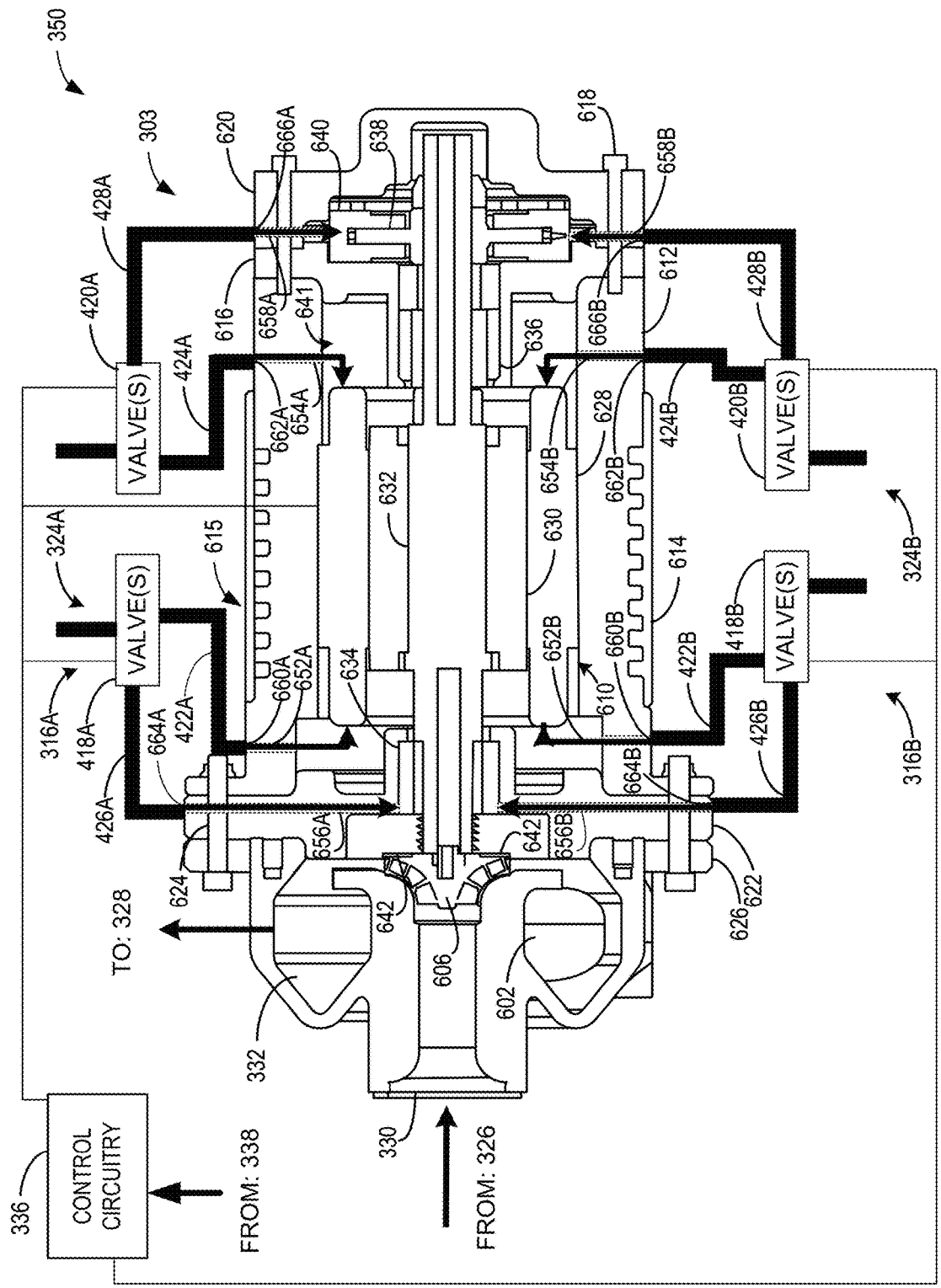
FIG. 6B is a schematic illustration of a second example thermal transport bus pump of the example thermal management system of FIG. 3B.

FIG. 6A is a schematic illustration of an example implementation of the pump 302 of FIGS. 3A and 3C. FIG. 6B is a schematic illustration of an example implementation of the pump 303 of FIGS. 3B and 3D. In the illustrated example of FIGS. 6A and 6B, during normal operations, the pumps 302, 303 drive a heat exchange fluid, such as gaseous and/or supercritical carbon dioxide, through the thermal transport bus 304 of FIGS. 3A-3D. Specifically, the heat exchange fluid from the primary input conduit 326 flows through the primary inlet 330 and encounters an impeller 606 (e.g., a compressor wheel) that rotates to drive the heat exchange fluid through the primary outlet 332. In turn, the thermal transport bus 304 can feed the heat exchange fluid to one or more heat exchangers (e.g., the heat exchanger(s) 306, 308 of FIGS. 3A-3D). Accordingly, the thermal transport bus pump 302, 303 can pump the heat exchange fluid to manage a thermal energy of working fluids associated with the aircraft 10 of FIG. 1 and/or the gas turbine engine 100 of FIG. 2.

In the illustrated example of FIGS. 6A and 6B, the pumps 302, 303 include a motor 610 positioned in a housing 615. In FIGS. 6A and 6B, the motor 610 is an induction motor operatively coupled (e.g., communicatively coupled) to the control circuitry 336. For example, the control circuitry 336 can include, or be communicatively coupled to, a variable frequency drive (VFD) that controls a rotational speed of the motor 610. For example, the control circuitry 336 can operate the motor 610 based on an operational stage of the associated thermal management system (e.g., thermal management system 300, 350, 360, 370 (FIGS. 3A-3D)), a pressure of the heat exchange fluid in the thermal transport bus 304 and/or in the thermal transport bus pump 302, 303, and/or a temperature of the heat exchange fluid in the thermal transport bus 304 and/or in the thermal transport bus pump 302, 303. Specifically, during pre-start operations, the control circuitry 336 causes the motor 610 to not drive (e.g., rotate) the impeller 606. Further, during normal operations, the control circuitry 336 causes a drive signal to be transmitted to the motor 610 such that the motor 610 drives the impeller 606 and, in turn, the pump 302, 303 drives the heat exchange fluid. In some examples, during normal operations, the control circuitry 336 operates the motor 610 based on a pressure and/or a temperature of the working fluids affected by the heat exchange fluid. Additionally or alternatively, during normal operations, the control circuitry 336 can operate the motor 610 based on vibration measurements obtained by accelerometers operatively coupled to the thermal transport bus pump 302, 303.

In the illustrated examples of FIGS. 6A and 6B, the housing 615 includes an intermediate housing 612, an aft bearing housing 616, an end cap 620, a forward bearing housing 622, and a backplate 626. The intermediate housing 612 is at least partially surrounded by a cooling jacket 614 to prevent the motor 610 from overheating during normal operations. An aft end of the intermediate housing 612 is coupled to the aft bearing housing 616 via first bolts 618. Furthermore, the end cap 620 is coupled to the aft bearing housing 616 and the intermediate housing 612 via the first bolts 618. A forward end of the intermediate housing 612 is coupled to the forward bearing housing 622 opposite the aft bearing housing 616 via second bolts 624. Moreover, the forward bearing housing 622 is coupled to the backplate 626, which defines the primary inlet 330 and the primary outlet 332, on an opposite side of the backplate 626 via the second bolts 624.

In the illustrated examples of FIGS. 6A and 6B, the motor 610 includes a stator 628 to induce alternating electrical currents in field coils and emit alternating magnetic fields about a central axis of the motor 610. The alternating magnetic fields interact with permanent magnets of a rotor 630 and, in turn, provide torque to the rotor 630. The rotor 630 is fixedly coupled to an impeller shaft 632 ("shaft 532"), and a first end of the shaft 632 is fixedly coupled to the impeller 606. As such, the motor 610 drives a rotation of the shaft 632 and, in turn, a rotation of the impeller 606. The first end of the shaft 632 is supported by a first radial foil bearing 634, which is coupled to the forward bearing housing 622. Similarly, a second end of the shaft 632 is supported by a second radial foil bearing 636 coupled to the aft bearing housing 616.

In the illustrated examples of FIGS. 6A and 6B, the first radial foil bearing 634 and the second radial foil bearing 636 include spring-loaded foil journal linings that support radial loads of the shaft 632 during substantially low (e.g., startup) rotational speeds (e.g., 0-5,000 rotations per minute (rpm), etc.). When the heat exchange fluid is in the supercritical and/or gaseous state and the motor 610 causes the shaft 632 to rotate at a substantially high (e.g., operational) rotational speed (e.g., 5000-20,000 rpm, etc.), a pressure of the heat exchange fluid (e.g., air, oil, supercritical carbon dioxide ($sCO_2$), etc.) around the shaft 632 pushes the foil lining radially outward. Thus, when the heat exchange fluid is in the supercritical and/or gaseous state, the pressurized heat exchange fluid supports the radial loads of the shaft 632 when the shaft 632 is rotating at operational speeds (e.g., 3000 rpm, 10,000 rpm, 25,000 rpm, etc.).

In the illustrated examples of FIGS. 6A and 6B, a thrust disc 638 of the shaft 632 is supported by a thrust bearing system 640. For example, the thrust bearing system 640 can include foil bearings to support axial loads of the shaft 632 via interactions with the thrust disc 638. In some examples, the thrust bearing system 640 is coupled to the aft bearing housing 616 and/or the end cap 620 via bolts. Accordingly, the first radial foil bearing 634, the second radial foil bearing 636, the thrust bearings system 640 are positioned in a chamber 641 defined by the housing 615.

In some examples, the impeller 606 includes expeller vanes 642 on a face of the impeller 606 that faces the motor 610. During normal operations, at certain operational speeds of the motor 610, the expeller vanes 642 cause a portion of the heat exchange fluid (e.g., $sCO_2$) to flow forward from the forward bearing housing 622, the intermediate housing 612, etc. into the fluid conduit 602.

In the illustrated example of FIG. 6A, the pump 302 includes a first flowline 652 (e.g., a first conduit, a first space between components of the pump 302 to define the first flowline 652), a second flowline 654 (e.g., a second conduit, a second space between components of the pump 302 to define the second flowline 654), a third flowline 656 (e.g., a third conduit, a third space between components of the pump 302 to define the third flowline 656), and a fourth flowline 658 (e.g., a fourth conduit, a fourth space between components of the pump 302 to define the fourth flowline 658). In the illustrated example of FIG. 6A, the pump 302 includes a first secondary inlet 660, a second secondary inlet 662, a third secondary inlet 664, and a fourth secondary inlet 666. The first secondary inlet 660 is defined at an end of the first flowline 652. The second secondary inlet 662 is defined at an end of the second flowline 654. The third secondary inlet 664 is defined at an end of the third flowline 656. The fourth secondary inlet 666 is defined at an end of the fourth flowline 658.

In the illustrated example of FIG. 6A, a portion of the thermal control system 316 is shown. In FIG. 6A, the first input 422 of the third feedback conduit(s) 324 is coupled to the pump 302 at the first secondary inlet 660. As such, the first input 422 delivers fluid to the first flowline 652 and, thus, a first longitudinal end of the motor 610. The second input 424 of the third feedback conduit(s) 324 is coupled to the pump 302 at the second secondary inlet 662. As such, the second input 424 delivers fluid to the second flowline 654. The third input 426 of the third feedback conduit(s) 324 is coupled to the pump 302 at the third secondary inlet 664. As such, the third input 426 delivers fluid to the third flowline 656. Further, the fourth input 428 of the third feedback conduit(s) 324 is coupled to the pump 302 at the fourth secondary inlet 666. As such, the fourth input 428 delivers fluid to the fourth flowline 658. In FIG. 6A, the fourth valve(s) 418 are coupled to the first input 422 and/or the third input 426. Additionally, the fifth valve(s) 420 are coupled to the second input 424 and/or the fourth input 428.

The first flowline 652 directs the fluid from the first secondary inlet 660 toward a first longitudinal end (e.g., a first face) of the motor 610. The second flowline 654 directs the fluid from the second secondary inlet 662 toward a second longitudinal end (e.g., a second face) of the motor 610 opposite the first longitudinal end. The third flowline 656 directs the fluid from the third secondary inlet 664 toward the first radial foil bearing 634. The fourth flowline 658 directs the fluid from the fourth secondary inlet 666 toward the thrust bearing system 640 and/or the second radial foil bearing 636.

Similarly, in the illustrated example of FIG. 6B the pump 303 includes first flowlines 652A, 652B (e.g., the first flowline 652 of FIG. 6A in a first position and a second position), second flowlines 654A, 654B (e.g., the second flowline 654 of FIG. 6A in a first position and a second position), third flowlines 656A, 656B (e.g., the third flowline 656 of FIG. 6A in a first position and a second position), fourth flowlines 658A, 658B (e.g., the fourth flowline 658 of FIG. 6A in a first position and a second position). Additionally, the pump 303 includes first secondary inlets 660A, 660B defined at respective ends of the first flowlines 652A, 652B, second secondary inlets 662A, 662B defined at respective ends of the second flowlines 654A, 654B, third secondary inlets 664A, 664B defined at respective ends of the third flowlines 656A, 656B, and fourth secondary inlets 666A, 666B defined at respective ends of the fourth flowlines 658A, 658B.

Furthermore, in the illustrated example of FIG. 6B, a portion of the thermal control systems 316A, 316B of FIGS. 3B and 3D are shown. In FIG. 6B, first inputs 422A, 422B of the third feedback conduits 324A, 324B are coupled to the pump 303 at the respective first secondary inlets 660A, 660B. Second inputs 424A, 424B of the third feedback conduits 324A, 324B are coupled to the pump 303 at the respective second secondary inlets 662A, 662B. Third inputs 426A, 426B of the third feedback conduits 324A, 324B are coupled to the pump 303 at the respective third secondary inlets 664A, 664B. Fourth inputs 428A, 428B of the third feedback conduit(s) 324A, 324B are coupled to the pump 303 at the respective fourth secondary inlets 666A, 666B. Further, fourth valves 418A, 418B of the thermal control systems 316A, 316B are coupled to the first inputs 422A, 422B and/or the third inputs 426A, 426B of the third feedback conduit(s) 324A, 324B. Additionally, fifth valves 420A, 420B of the thermal control systems 316A, 316B are coupled to the second inputs 424A, 424B and/or the fourth inputs 428A, 428B of the third feedback conduit(s) 324A, 324B. Accordingly, the thermal control systems 316A, 316B of FIG. 6B form two separate instances of the thermal control system 316 of FIG. 6A to provide additional fluid to the chamber 641 of the pump 303. As a result, the thermal control systems 316A, 316B can increase the pressure of the fluid in the chamber 641 at a faster rate than the lone thermal control system 316 of FIG. 6A. In some examples, more than two instances of the thermal control system 316 are utilized for a pump. In such examples, the quantity of the thermal control systems 316 is based on the pump design and a desired pressure increase to be provided by the thermal control systems 316.

In the illustrated example of FIGS. 6A and 6B, the control circuitry 336 controls operations of the motor 610 and respective positions of the fourth valve(s) 418 and the fifth valve(s) 420 based on the fluid temperature and/or pressure measured by the sensors 338. More particularly, the control circuitry 336 determines whether and/or how much of the heat exchange fluid in the pump 302, 303 and/or the thermal transport bus 304 is in the liquid state. When the control circuitry 336 determines that the amount of heat exchange fluid in the liquid state does not satisfy a liquid threshold, the control circuitry 336 determines that pre-start operations are to be performed. During the pre-start operations, the control circuitry 336 causes the fourth valve(s) 418 to be in the associated first position, which causes higher pressure and/or temperature fluid from the thermal control system 316 to be directed towards the first radial foil bearing 634. Additionally, the control circuitry 336 causes the fifth valve(s) 420 to be in the associated first position, which causes the higher pressure and/or temperature fluid from the thermal control system 316 to be directed towards the thrust bearing system 640 and/or the second radial foil bearing 636. As a result, the fluid from the thermal control system 316 can convert and/or replace fluid in the chamber 641 of the pump 302, 303 that is in the liquid state to/with fluid that is in the gaseous and/or supercritical state. Furthermore, during the pre-start operations, the control circuitry 336 prevents the motor 610 from driving a rotation of the shaft 632.

When the control circuitry 336 determines that the amount of heat exchange fluid in the liquid state satisfies the liquid threshold (e.g., the pump 302, 303 contains no fluid in the liquid state), the control circuitry 336 determines that normal operations are to be performed. During the normal operations, the control circuitry 336 causes the fourth valve(s) 418 to be in the associated second position, which causes cooler fluid from the thermal control system 316 to be directed towards the first end of the motor 610. Additionally, the control circuitry 336 causes the fifth valve(s) 420 to be in the associated second position, which causes the cooler fluid from the thermal control system to be directed towards the second end of the motor 610. Thus, the cooler fluid can cool the motor and/or other components within the pump 302, 303 to reduce vibrations and/or wear.

In some examples, the thermal management system 300, 350, 360, 370 includes means for pumping. For example, the means for pumping may be implemented by the pump 302 of FIGS. 3A, 3C, and/or 6A and/or the pump 303 of FIGS. 3B, 3D, and/or 6B. In some examples, the means for pumping includes means for driving a fluid. For example, the means for driving the fluid may be implemented by the motor 610, the shaft 632, and/or the impeller 606. In some examples, the means for pumping includes means for bearing the means for driving. For example, the means for bearing may be implemented by the first radial foil bearing 634, the second radial foil bearing 636, and/or the thrust bearing system 640. In some examples, the means for pumping includes means for containing the means for bearing. For example, the means for containing may be implemented by the housing 615, the aft bearing housing 616, the end cap 620, the forward bearing housing 622, and/or the backplate 626.

In some examples, the thermal management system 300, 350, 360, 370 includes means for conveying. For example, the means for conveying may be implemented by the thermal transport bus 304 and/or the feedback conduits 318, 342.

In some examples, the thermal management system 300, 350, 360, 370 includes means for heating. For example, the means for heating may be implemented by the heater 408.

In some examples, the thermal management system 300, 350, 360, 370 includes means for injecting. For example, the means for injecting may be implemented by the first injector 412, the second injector 414, the injector system 430, and/or the injector system 440.

In some examples, the thermal management system 300, 350, 360, 370 includes means for containing fluid in the liquid state. For example, the means for containing the fluid in the liquid state may be implemented by the accumulator 404.

In some examples, the thermal management system 300, 350, 360, 370 includes means for directing flow. For example, the means for directing flow may be implemented by the first valve 402, the second valve 406, the third valve 410, the fourth valve(s) 418, the fifth valve(s) 420, and/or the sixth valve 442.

In some examples, the thermal management system 300, 350, 360, 370 includes means for measuring fluid parameters. For example, the means for measuring may be implemented by the sensors 338.

In some examples, the thermal management system 300, 350, 360, 370 includes means for controlling operations. For example, the means for controlling may be implemented by the control circuitry 336. In some examples, the control circuitry 336 may be instantiated by programmable circuitry such as the example programmable circuitry 812 of FIG. 8. For instance, the control circuitry 336 may be instantiated by a microprocessor executing machine executable instructions such as those implemented by at least blocks 702, 704, 706, 708, 710, 712, 714, 716, 718, 720, 722 of FIG. 7. In some examples, the control circuitry 336 may be instantiated by hardware logic circuitry, which may be implemented by an ASIC, XPU, or FPGA circuitry configured and/or structured to perform operations corresponding to the machine readable instructions. Additionally or alternatively, the control circuitry 336 may be instantiated by any other combination of hardware, software, and/or firmware. For example, the control circuitry 336 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The control circuitry 336 of FIGS. 3A-3D may be implemented by hardware alone or by hardware in combination with software and/or firmware. Thus, for example, the control circuitry 336, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example control circuitry 336 of FIGS. 3A-3D may include one or more elements, processes, and/or devices in addition to, or instead of, those illustrated in FIGS. 3A-3D, and/or may include more than one of any or all of the illustrated elements, processes and devices.

Figure 7:
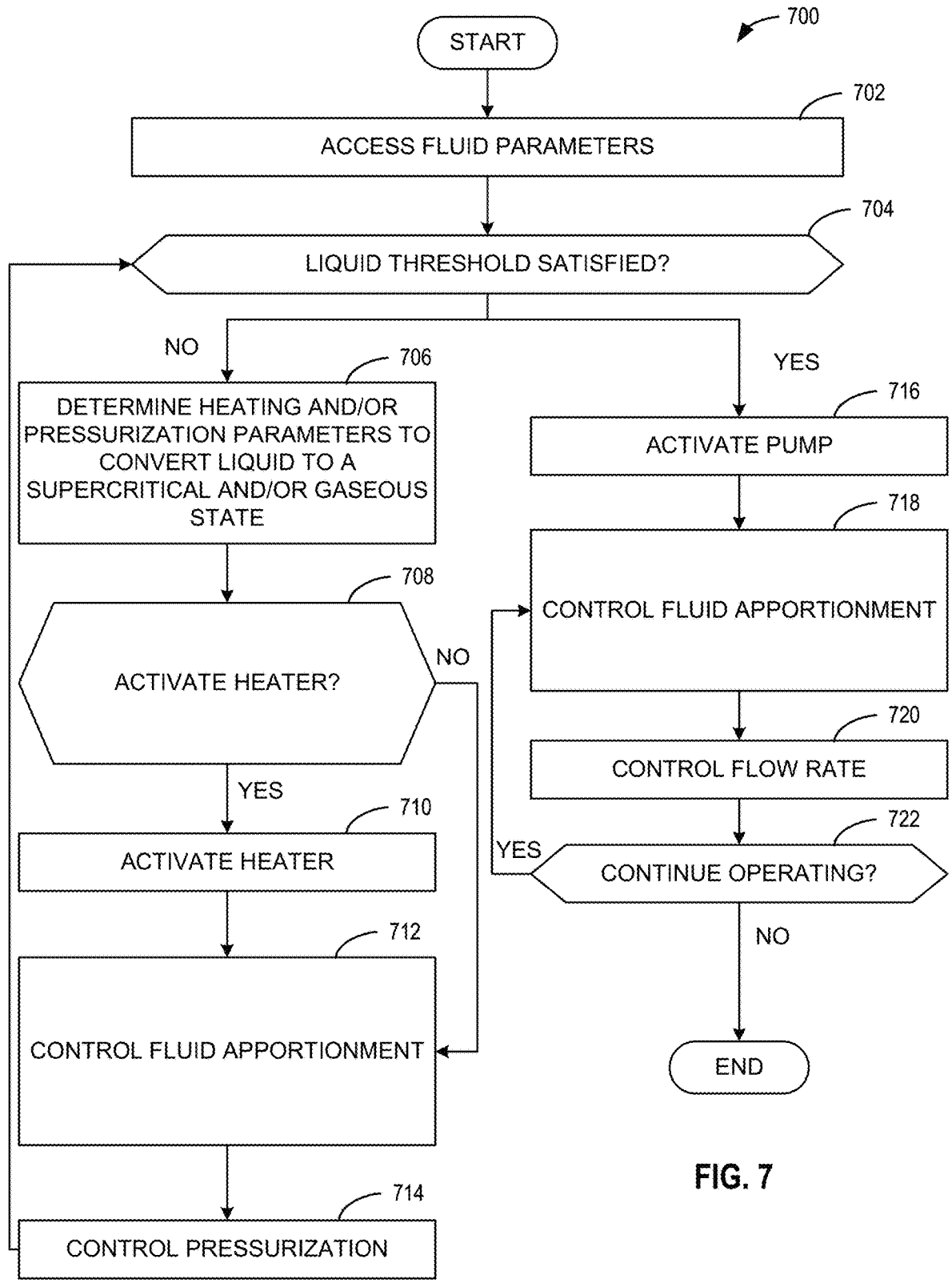
FIG. 7 is a flowchart representative of example machine readable instructions and/or example operations that may be executed, instantiated, and/or performed by example programmable circuitry to implement example control circuitry associated with the example thermal management systems of FIGS. 3A and 3B, the example thermal control systems of FIGS. 4A and 4B, and the example thermal transport bus pumps of FIGS. 6A and 6B.

A flowchart representative of example machine readable instructions, which may be executed by programmable circuitry to implement and/or instantiate the control circuitry 336 of FIGS. 3A-3D and/or representative of example operations which may be performed by programmable circuitry to implement and/or instantiate the control circuitry 336 of FIGS. 3A-3D, is shown in FIG. 7. The machine readable instructions may be one or more executable programs or portion(s) of one or more executable programs for execution by programmable circuitry such as the programmable circuitry 812 shown in the example processor platform 800 discussed below in connection with FIG. 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 7, many other methods of implementing the example control circuitry 336 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 7 is a flowchart representative of example machine readable instructions and/or example operations 700 that may be executed, instantiated, and/or performed by programmable circuitry to convert and/or replace fluid in a pump (e.g., the pump 302 of FIGS. 3A, 3C, and 6A, the pump 303 of FIGS. 3B, 3D, and 6B) that is in a liquid state to/with fluid in a gaseous and/or supercritical state during pre-start operations (e.g., before the pump is active and propelling the fluid). As such, the operations 700 prevent foil bearings (e.g., the first radial foil bearing 634 of FIGS. 6A and 6B, the second radial foil bearing 636 of FIGS. 6A and 6B, the thrust bearing system 640 of FIGS. 6A and 6B) from encountering a windage loss, a film thickness/stiffness, etc., that would otherwise prevent or hinder lifting of the component within (e.g., supported by) the foil bearing, which would adversely affect the rotation of the component and cause the foil bearing to wear. Additionally, the operations 700 can cause cooling fluid to be delivered to the pump during normal operations (e.g., when the pump is propelling the fluid) to prevent a motor (e.g., the motor 610 of FIGS. 6A and 6B) and/or other pump components from overheating and/or vibrating as a result of encountering a higher temperature (e.g., 400° F. or greater).

The example machine-readable instructions and/or the example operations 700 of FIG. 7 begin at block 702, at which the control circuitry 336 (FIGS. 3A-3D, 4A-4G, and 6A-6B) accesses fluid parameters. For example, the control circuitry 336 can access measurements from the sensors 338

(FIGS. 3A-3D). As such, the control circuitry 336 can access a temperature and/or a pressure of the fluid in the pump 302 (FIGS. 3A, 3C, 4A-4G, and 6A), the pump 303 (FIGS. 3B, 3D, 4A-4G, and 6B), and/or the thermal transport bus 304 (FIGS. 3A-3D).

At block 704, the control circuitry 336 determines whether a liquid threshold is satisfied. For example, the control circuitry 336 can determine whether and/or how much of the fluid in the pump 302, 303 and/or the thermal transport bus 304 is in the liquid state based on the measurements from the sensors 338. In some examples, the control circuitry 336 compares the pressure and/or the temperature measured by the sensors 338 to one or more pressure threshold(s) and/or temperature threshold(s) to determine whether the liquid threshold is satisfied. For example, a temperature threshold can correspond to a critical point temperature of the fluid (e.g., 87.8° F. for CO2), and the pressure threshold can correspond to a critical point pressure of the fluid (e.g., 73.8 bar for CO2). When the control circuitry 336 determines that the liquid threshold is not satisfied (e.g., block 704 returns a result of "NO"), the operations 700 proceed to block 706. Otherwise, when the control circuitry 336 determines that the liquid threshold is satisfied (e.g., block 704 returns a result of "YES"), the operations 700 skip to block 716.

At block 706, the control circuitry 336 determines heating and/or pressurization parameters needed to convert the fluid that is in the liquid state to a supercritical and/or gaseous state. For example, the control circuitry 336 can determine a temperature increase and/or a pressure increase that would cause the fluid that is in the liquid state to be converted to and/or replaced with fluid in a gaseous and/or supercritical state. In some examples, the pressure increase and/or the temperature increase are based on the difference between the measured pressure and/or temperature and the critical point pressure and/or temperature.

At block 708, the control circuitry 336 determines whether to activate the heater 408 (FIGS. 4A-4G) to achieve the determined heating and/or pressurization parameters. For example, the control circuitry 336 can determine the pressure and/or temperature increase that is providable by one or more injectors (e.g., the first injector 412 (FIGS. 4A-4D), the second injector 414 (FIGS. 4A-4D), the injector(s) of the injector system 430 (FIG. 4E), the injector(s) of the injector system 440 (FIGS. 4F-4G) of a thermal control system (e.g., the thermal control system 316, 316A, 316B (FIGS. 3A-3B), the thermal control system 340, 340A, 340B (FIGS. 3C, 3D, and 4G), the thermal control system 400 (FIG. 4A), the thermal control system 405 (FIG. 4B), the thermal control system 415 (FIG. 4C), the thermal control system 425 (FIG. 4D), the thermal control system 435 (FIG. 4E), the thermal control system 445 (FIG. 4F)). In some examples, the control circuitry 336 identifies a predetermined maximum pressure and/or temperature increase that is providable by the injector(s) of the thermal control system. In such examples, the control circuitry 336 compares the predetermined maximum pressure and/or temperature increase to the difference between the measured pressure and/or temperature and the critical point pressure and/or temperature (e.g., 73.8 bar and 87.8° F. for CO2). In such examples, the control circuitry 336 determines that the heater 408 is to be activated in response to the difference between the measured pressure and/or temperature and the critical point pressure and/or temperature being greater than the predetermined maximum pressure and/or temperature increase providable by the injector(s). In some examples, the control circuitry 336 determines the predetermined maximum pressure and/or temperature increase based on the current temperature and/or pressure of the fluid. For example, the control circuitry 336 can determine a first pressure increase is obtainable when the fluid has a first pressure, and a second pressure increase greater than the first pressure increase is obtainable when the fluid has a second pressure less than the first pressure. Furthermore, the predetermined maximum pressure and/or temperature increase can be based on the type and/or quantity of the injector(s), the volume of fluid in the system, the volume of fluid in the pump, and/or a liquid storage capacity of the accumulator 404 (FIGS. 4A-4G). For example, the control circuitry 336 can determine that fluid having a temperature of 275 Kelvin and a pressure of 50 bar can be pressurized by the injector(s) to reach 100 bar and 325 Kelvin. When the control circuitry 336 determines that the heater 408 is to be activated (e.g., block 708 returns a result of "YES"), the operations 700 proceed to block 710. Otherwise, when the control circuitry 336 determines that the heater 408 is not to be activated (e.g., block 708 returns a result of "NO"), the operations 700 skip to block 712.

At block 710, the control circuitry 336 activates the heater 408. For example, the control circuitry 336 can transmit a control signal to the heater 408 to cause the heater 408 to generate heat. In some examples, the control circuitry 336 controls the heater 408 based on an amount of heat needed for the fluid to reach the critical point pressure and/or temperature (e.g., 73.8 bar and 87.8° F. for CO2).

At block 712, the control circuitry 336 controls a fluid apportionment utilized by the thermal control system. For example, the control circuitry 336 can control the amount of fluid that the thermal control system uses from the primary input conduit 326 (FIGS. 3A-3D, 4A-4G, and 6A-6B), the primary output conduit 328 (FIGS. 3A-3D, 4A-4F, and 6A-6B), and/or the accumulator 404 based on the difference between the measured pressure and/or temperature and the critical point pressure and/or temperature. In some examples, the control circuitry 336 determines a first share of the fluid to be injected into the pump 302, 303 that is to be formed by the fluid from the primary input conduit 326. In some examples, the control circuitry 336 determines a second share of the fluid to be injected into the pump 302, 303 that is to be formed by the fluid from the primary output conduit 328. In some examples, the control circuitry determines a third share of the fluid to be injected into the pump 302, 303 that is to be formed by the fluid from the accumulator 404. In some examples, the control circuitry 336 can determine the first, second, and third shares based on the temperature and/or pressure of the fluid and/or the amount of fluid in the accumulator 404 relative to the capacity of the accumulator 404. In some examples, the control circuitry 336 determines the first, second, and third shares based on the liquid threshold and the amount of liquid in the pump 302, 303 and/or the thermal transport bus 304. In some examples, the control circuitry 336 controls the positions of the first valve 402 (FIGS. 4A, 4B, 4E, 4F, and 4G), the second valve 406 FIGS. 4A, 4C, 4E, 4F, and 4G), and/or the third valve 410 (FIGS. 4A, 4B, and 4E) in the thermal control system to control the mixture of fluid to be provided to the pump 302, 303. In some examples, the control circuitry 336 controls the injector(s) based on the identified mixture to be delivered.

At block 714, the control circuitry 336 controls the pressurization (e.g., the pressure increase) that is provided by the injector(s) that inject the fluid into the pump 302, 303. For example, the control circuitry 336 can cause the injector(s) to increase the pressure of the fluid based on the difference between the measured pressure and/or temperature and the critical point pressure and/or temperature (e.g., to reach 73.8 bar and/or 87.8° F. for CO2).

At block 716, the control circuitry 336 activates the pump 302, 303. For example, the control circuitry 336 can transmit a drive signal to the motor 610 (FIGS. 6A-6B) of the pump 302, 303 when the fluid satisfies the liquid threshold (e.g., when less than 1% of the fluid in the pump 302, 303 is in the liquid state).

At block 718, the control circuitry 336 controls the fluid apportionment that is utilized by the thermal control system. For example, the control circuitry 336 can determine the amount of fluid that the thermal control system uses from the primary input conduit 326, the primary output conduit 328, and/or the accumulator 404 based on a temperature of the fluid in the pump 302, 303 and/or an amount of cooling needed. In some examples, the control circuitry 336 controls a usage of the fluid from the primary output conduit 328 in a manner inversely proportional to the temperature of the fluid in the pump 302, 303. For example, the control circuitry 336 can reduce and/or block fluid from the primary output conduit 328 from being utilized in response to the temperature of the fluid in the pump 302, 303 satisfying (e.g., being greater than, being greater than or equal to) a temperature threshold. In some examples, the control circuitry 336 controls a usage of the fluid from the accumulator 404 in a manner directly proportional to the temperature of the fluid in the pump 302, 303. For example, the control circuitry 336 can control the second valve 406 and/or the injector(s) to increase a usage of the fluid from the accumulator 404 when the temperature of the fluid in the pump 302, 303 increases. In some examples, the control circuitry 336 causes the valve 406 to be in a first position (e.g., a first partially open position) when the temperature of the fluid in the pump 302, 303 is a first temperature (e.g., 325° F.) and causes the valve 406 to be in a second position (e.g., a second partially open position, a fully open position) that enables more fluid from the accumulator 404 to enter the first feedback conduit(s) 320 relative to the first position when the temperature of the fluid in the pump 302, 303 is a second temperature (e.g., 350° F.) greater than the first temperature. Moreover, the control circuitry 336 can communicate safety signals to the valves 312, 314, 402, 406, 410, 418, 420, 442 to cause the valves 312, 314, 402, 406, 410, 418, 420, 442 to default to a predetermined position (e.g., an open position, a closed position, etc.) when the safety signal is not received after a predetermined period of time. As such, the thermal management systems 300, 350, 360, 370 are protected when the control circuitry 336 malfunctions.

At block 720, the control circuitry 336 controls a flow rate of the fluid that the injector(s) inject into the pump 302, 303. For example, the control circuitry 336 can control the flow rate based on the temperature of the fluid in the pump 302, 303. In some examples, the control circuitry 336 increases the flow rate in a manner directly proportional to the temperature of the fluid in the pump 302, 303.

At block 722, the control circuitry 336 determines whether to continue operating. When the control circuitry 336 determines that operations are to continue (e.g., block 722 returns a result of "YES"), the operations 700 return to block 718. Otherwise, when the control circuitry 336 determines that the operations are not to continue (e.g., block 722 returns a result of "NO"), the operations 700 terminate.

Figure 8:
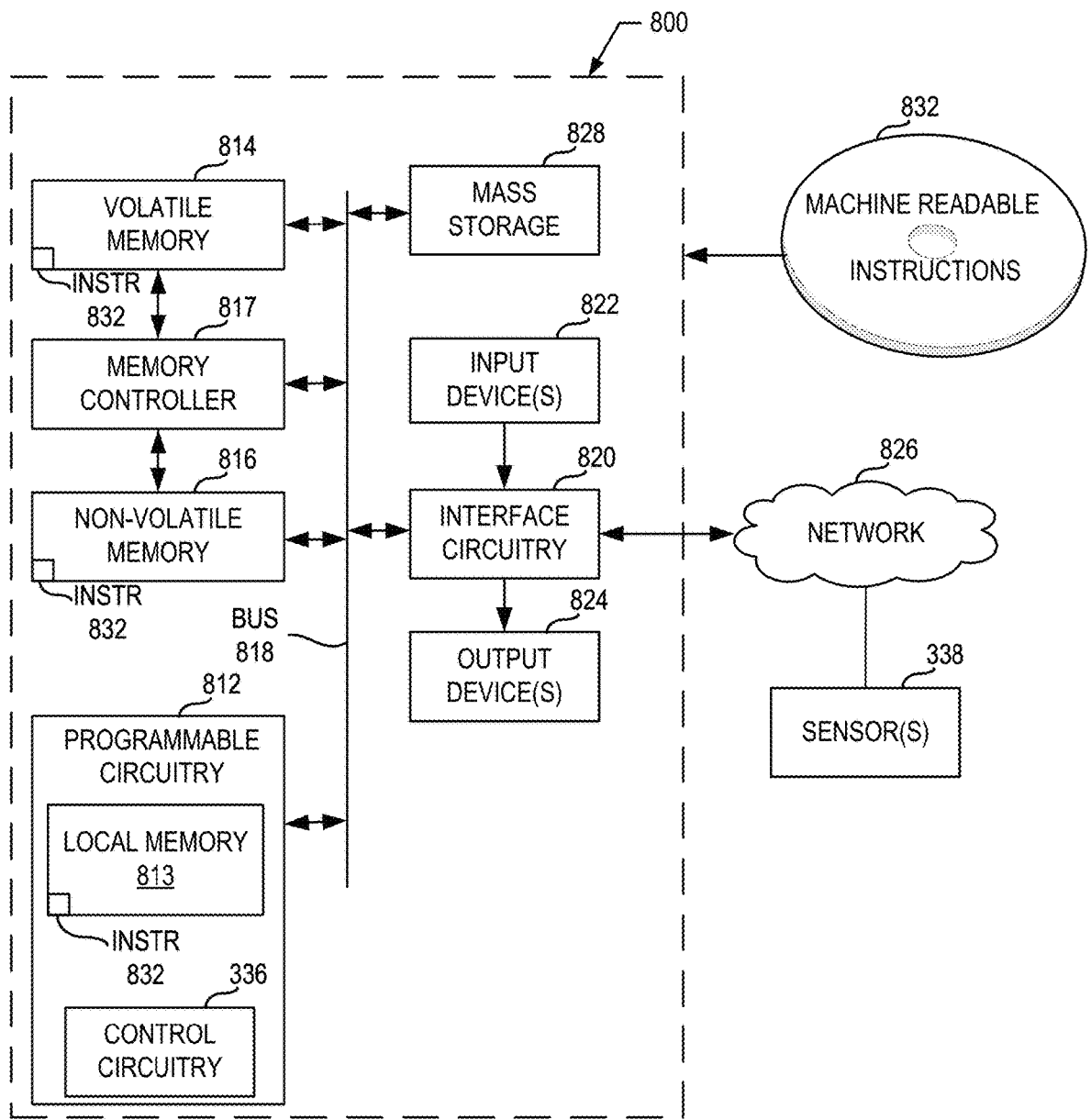
FIG. 8 is a block diagram of an example processing platform including programmable circuitry structured to execute, instantiate, and/or perform the example machine readable instructions and/or perform the example operations of FIG. 7 to implement the control circuitry of FIGS. 3A, 3B, 4A, 4B, 4C, 4D, 6A, and 6B.

FIG. 8 is a block diagram of an example programmable circuitry platform 800 structured to execute and/or instantiate the example machine-readable instructions and/or the example operations of FIG. 7 to implement the control circuitry 336 of FIGS. 3A-3D. The programmable circuitry platform 800 can be, for example, a digital computer (e.g., a Full Authority Digital Engine Control (FADEC), an Electronic Engine Control (EEC), an engine control unit (ECU), etc.) or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the control circuitry 336.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS & Dynamic Random Access Memory (RDRAMR), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. In this example, the sensors 338 are in communication with the interface circuitry 820 via the network 826.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIG. 7, may be stored in the mass storage device 828, in the volatile memory 814, in the non-volatile memory 816, and/or on at least one non-transitory computer readable storage medium such as a CD or DVD which may be removable.

It should now be understood that that the devices, systems, and methods described herein enable fluid in a pump that is in the liquid state to be at least partially removed or converted to a gaseous and/or supercritical state before pump operations begin. As such, the presently described technology prevents the fluid that is in the liquid state from adversely affecting components of the pump, such as by causing a windage loss, a film thickness/stiffness, etc. that prevents or hinders lifting of a component within (e.g., supported by) a foil bearing(s) of the pump. Additionally, the presently described technology improves operations of the pump during normal operations (e.g., while the pump is operating) by maintaining a temperature of the fluid in the pump within a predetermined range (e.g., below 400° F.) to reduce vibrations and/or increase a lifespan of a motor and/or other components of the pump.

Example apparatus, systems, and methods to maintain a state of fluid in a system are disclosed herein. Further examples and combinations thereof include the following:

A system including a pump including a primary inlet, a primary outlet, and a secondary inlet, a first conduit including a first end coupled to the pump at the primary inlet, a second conduit including a second end coupled to the pump at the primary outlet, at least one injector including a first inlet, a second inlet, and at least one outlet, the injector to drive fluid that flows through the first inlet and the second inlet through the at least one outlet, a third conduit including a third end and a fourth end, the third end coupled to the first conduit upstream of the primary inlet, the fourth end coupled to the at least one injector at the first inlet to deliver the fluid, a fourth conduit including a fifth end and a sixth end, the fifth end coupled to the second conduit downstream of the primary outlet, the sixth end coupled to the at least one injector at the second inlet to deliver the fluid, and a fifth conduit including a seventh end and an eighth end, the seventh end coupled to the at least one injector at the at least one outlet to receive the fluid, the eighth end coupled to the pump at the secondary inlet to deliver the fluid.

A system including a pump including a primary inlet, a primary outlet, a first secondary inlet, and a second secondary inlet, a first conduit including a first end coupled to the pump at the primary inlet, a second conduit including a second end coupled to the pump at the primary outlet, at least one first injector including a first inlet, a second inlet, and at least one first outlet, the at least one first injector to drive fluid that flows through the first inlet and the second inlet through the at least one first outlet, at least one second injector including a third inlet, a fourth inlet, and at least one second outlet, the at least one second injector to drive the fluid that flows through the third inlet and the fourth inlet through the at least one second outlet, a third conduit including a third end and a fourth end, the third end coupled to the first conduit upstream of the primary inlet, the fourth end coupled to the at least one first injector at the first inlet to deliver the fluid, a fourth conduit including a fifth end and a sixth end, the fifth end coupled to the second conduit downstream of the primary outlet, the sixth end coupled to the at least one first injector at the second inlet to deliver the fluid, a fifth conduit including a seventh end and an eighth end, the seventh end coupled to the at least one first injector at the at least one first outlet to receive the fluid, the eighth end coupled to the pump at the first secondary inlet to deliver the fluid, a sixth conduit including a ninth end and a tenth end, the ninth end coupled to the first conduit upstream of the primary inlet, the tenth end coupled to the at least one second injector at the third inlet to deliver the fluid, a fourth conduit including an eleventh end and a twelfth end, the eleventh end coupled to the second conduit downstream of the primary outlet, the twelfth end coupled to the at least one second injector at the fourth inlet to deliver the fluid, and an eighth conduit including a thirteenth end and a fourteenth end, the thirteenth end coupled to the at least one second injector at the at least one second outlet to receive the fluid, the fourteenth end coupled to the pump at the second secondary inlet to deliver the fluid.

A system including a pump including a primary inlet, a primary outlet, and a secondary inlet, a first conduit including a first end coupled to the pump at the primary inlet, a second conduit including a second end coupled to the pump at the primary outlet, at least one injector including at least one inlet and at least one outlet, the at least one injector to drive fluid that flows through the at least one inlet through the at least one outlet, a third conduit including a third end and a fourth end, the third end coupled to the first conduit upstream of the primary inlet, the fourth end coupled to the at least one injector at the at least one inlet to deliver the fluid, and a fourth conduit including a fifth end and a sixth end, the fifth end coupled to the at least one injector at the at least one outlet to receive the fluid, the sixth end coupled to the pump at the secondary inlet to deliver the fluid.

A system including a pump including a primary inlet, a primary outlet, a first secondary inlet, and a second secondary inlet, a first conduit including a first end coupled to the pump at the primary inlet, a second conduit including a second end coupled to the pump at the primary outlet, at least one first injector including at least one first inlet and at least one first outlet, the at least one first injector to drive fluid that flows through the at least one first inlet through the at least one first outlet, a third conduit including a third end and a fourth end, the third end coupled to the first conduit upstream of the primary inlet, the fourth end coupled to the at least one first injector at the at least one first inlet to deliver the fluid, a fourth conduit including a fifth end and a sixth end, the fifth end coupled to the at least one first injector at the at least one first outlet to receive the fluid, the sixth end coupled to the pump at the first secondary inlet to deliver the fluid, at least one second injector including at least one second inlet and at least one second outlet, the at least one second injector to drive fluid that flows through the at least one second inlet through the at least one second outlet, a fifth conduit including a seventh end and an eighth end, the seventh end coupled to the first conduit upstream of the primary inlet, the eighth end coupled to the at least one second injector at the at least one second inlet to deliver the fluid, a sixth conduit including an eighth end and a ninth end, the eighth end coupled to the at least one second injector at the at least one second outlet to receive the fluid, the ninth end coupled to the pump at the second secondary inlet to deliver the fluid.

A system including a pump including a primary inlet, a primary outlet, and a secondary inlet, a first conduit including a first end coupled to the pump at the primary inlet, a second conduit including a second end coupled to the pump at the primary outlet, at least one injector including at least one inlet and at least one outlet, a third conduit including a third end and a fourth end, the third end coupled to the first conduit upstream of the primary inlet, the fourth end coupled to the at least one injector at the at least one inlet to deliver the fluid, a fourth conduit including a fifth end and a sixth end, the fifth end coupled to the second conduit downstream of the primary outlet, and a fifth conduit including a seventh end and an eighth end, the seventh end coupled to the at least one injector at the at least one outlet to receive the fluid, the eighth end coupled to the pump at the secondary inlet to deliver the fluid, the sixth end coupled to the fifth conduit between the seventh end and the eighth end.

The system of any preceding clause, further including an accumulator coupled to the third conduit, the accumulator containing a liquid state of the fluid.

The system of any preceding clause, further including a heater coupled to a portion of the third conduit between the accumulator and the second end of the third conduit.

The system of any preceding clause, further including programmable circuitry to cause the heater to generate heat when a pressure of the fluid in the system does not satisfy a pressure threshold, and cause the heater to remain inactive when the pressure of the fluid in the system satisfies the pressure threshold.

The system of any preceding clause, wherein the secondary inlet is a first secondary inlet, wherein the pump includes a second secondary inlet, further including a nozzle operatively coupled to the at least one injector at the at least one outlet to receive the fluid, the nozzle including a first outlet and a second outlet separate from the first outlet, wherein the seventh end of the fifth conduit is operatively coupled to the nozzle at the first outlet to receive the fluid, and a sixth conduit including a ninth end and a tenth end, the ninth end of the sixth conduit operatively coupled to the nozzle at the second outlet to receive the fluid, the tenth end of the sixth conduit operatively coupled to the pump at the second secondary inlet to deliver the fluid.

The system of any preceding clause, wherein the secondary inlet is a first secondary inlet, wherein the pump includes a second secondary inlet, wherein the fluid enters the pump through the first secondary inlet and not the second secondary inlet during a first operation, and wherein the fluid enters the pump through the second secondary inlet and not the first secondary inlet during a second operation.

The system of any preceding clause, wherein the pump includes a motor, and wherein the second secondary inlet is positioned closer than the first secondary inlet to the motor.

The system of any preceding clause, wherein the second operation occurs after the first operation.

The system of any preceding clause, wherein the pump includes a foil bearing, wherein the first secondary inlet is positioned closer than the second secondary inlet to the foil bearing.

The system of any preceding clause, wherein the secondary inlet is a first secondary inlet, wherein the pump includes a second secondary inlet, further including a sixth conduit including a ninth end and a tenth end, the ninth end operatively coupled to the fifth conduit, the tenth end operatively coupled to the pump to deliver the fluid to the second secondary inlet, and a valve operatively coupled to the fifth conduit or the sixth conduit, the valve movable between a first position and a second position, wherein the fluid is to flow through the fifth conduit to the first secondary inlet when the valve is in the first position, and wherein the fluid is to flow through the sixth conduit to the second secondary inlet when the valve is in the second position.

The system of any preceding clause, further including processor circuitry to cause the valve to be in the first position when a pressure of the fluid does not satisfy a pressure threshold or a temperature of the fluid does not satisfy a temperature threshold, and cause the valve to be in the second position when the pressure of the fluid satisfies the pressure threshold or the temperature of the fluid satisfies the temperature threshold.

The system of any preceding clause, further including programmable circuitry to when the fluid in the system does not satisfy a liquid threshold, cause the pump to remain inactive, and when the fluid in the system satisfies the liquid threshold, cause power to be delivered to a motor of the pump.

The system of any preceding clause, wherein the fifth conduit includes a mixture of the fluid from the third conduit and from the fourth conduit, wherein the mixture includes a first percentage of the fluid from the third conduit when the fluid in the system does not satisfy a liquid threshold, and wherein the mixture includes a second percentage of the fluid from the third conduit when the fluid in the system satisfies the liquid threshold, the first percentage greater than the second percentage.

A system including a pump including a motor, a foil bearing, a primary inlet, a primary outlet, and a secondary inlet, a conduit including a first end and a second end, the first end coupled to the pump at the secondary inlet to deliver fluid, and a thermal management system including an accumulator to house the fluid in a liquid state, and an injector including an inlet and an outlet, the inlet to receive the fluid from the accumulator, the conduit coupled to the injector at the outlet to receive the fluid.

The system of any preceding clause, wherein the thermal management system includes a heater downstream of the accumulator and upstream of the injector.

The system of any preceding clause, further including programmable circuitry to control the heater to generate heat when a pressure of the fluid in the pump does not satisfy a pressure threshold or a temperature of the fluid in the pump does not satisfy a temperature threshold, and control the heater to remain inactive when the pressure of the fluid in the pump satisfies the pressure threshold or the temperature of the fluid in the pump satisfies the temperature threshold.

The system of any preceding clause, wherein the conduit is a first conduit and the secondary inlet is a first secondary inlet, wherein the pump includes a second secondary inlet, further including a second conduit including a third end and a fourth end, the third end coupled to the first conduit, the fourth end coupled to the pump at the second secondary inlet, and a valve operatively coupled to the first conduit or the second conduit, wherein the valve is movable between a first position and a second position, the first position of the valve to cause the fluid to flow through the first secondary inlet, the second position of the valve to cause the fluid to flow through the second secondary inlet.

The system of any preceding clause, wherein the first secondary inlet channels the fluid closer than the second secondary inlet to the motor, further including programmable circuitry to cause the valve to be in the second position when a pressure of the fluid in the pump does not satisfy a pressure threshold or a temperature of the fluid in the pump does not satisfy a temperature threshold, and cause the valve to be in the first position when the pressure of the fluid in the pump satisfies the pressure threshold or the temperature of the fluid in the pump satisfies the temperature threshold.

A system including means for pumping including means for driving a fluid, means for bearing the means for driving, and means for containing the means for bearing, the fluid in a first state of the fluid in the means for containing during first operations, the fluid in a second state of the fluid in the means for containing during second operations after the first operations, first means for conveying the fluid, second means for conveying the fluid, and means for injecting the fluid from the first means for conveying and the second means for conveying into the means for containing.

The system of any preceding clause, further including means for accumulating the fluid in the first state of the fluid, the means for injecting to receive a portion of the fluid from the means for accumulating.

The system of any preceding clause, wherein the pump includes a third secondary inlet and a fourth secondary inlet positioned on an opposite side of the motor relative to the first secondary inlet and the second secondary inlet, wherein the third secondary inlet is positioned closer to the motor than the first secondary inlet and the fourth secondary inlet.

The system of any preceding clause, wherein the pump includes a shaft and an impeller operatively coupled to the shaft, wherein the foil bearing is a radial foil bearing to support the shaft, and wherein the fourth secondary inlet is positioned closer to a thrust foil bearing than the first, second, and third secondary inlets.

The system of any preceding clause, further including at least one first valve and at least one second valve to block the fluid from entering the pump through the second secondary inlet and the third secondary inlet during first operations.

The system of any preceding clause, wherein the at least one first valve and the at least one second valve block the fluid from entering the pump through the first secondary inlet and the fourth secondary inlet during the second operations.

The system of any preceding clause, wherein the pump includes a shaft positioned along a longitudinal axis of the pump, and wherein the pump includes a fifth secondary inlet, a sixth secondary inlet, a seventh secondary inlet, and an eighth secondary inlet positioned on an opposite side of the longitudinal axis relative to the first secondary inlet, the second secondary inlet, the third secondary inlet, and the fourth secondary inlet.

The system of any preceding clause, wherein the at least one injector includes a first injector and a second injector, wherein the at least one outlet includes a first outlet and a second outlet, the first injector including the first inlet and the first outlet, the second injector including the second inlet and the second outlet.

The system of any preceding clause, wherein the nozzle includes a first inlet and a second inlet, the first inlet coupled to the first injector at the first outlet, the second inlet coupled to the second injector at the second outlet.

The system of any preceding clause, wherein the fluid includes a first fluid from the first injector and a second fluid from the second injector, wherein the nozzle includes a mixing chamber to mix the first fluid with the second fluid.

The system of any preceding clause, wherein the nozzle includes mixing conduits that carry the fluid from the first injector into the mixing chamber where the fluid from the first injector mixes with the fluid from the second injector.

The system of any preceding clause, wherein the first fluid has a different temperature than the second fluid.

The system of any preceding clause, wherein the fluid is a first fluid that exchanges thermal energy with a second fluid associated with an engine.

The system of any preceding clause, wherein the fluid is a first fluid that exchanges thermal energy with a second fluid associated with an aircraft.

A method including determining whether a fluid in a system satisfies a liquid threshold: when the fluid satisfies the liquid threshold, activating a pump to drive the fluid that enters the pump from a primary inlet through a primary outlet; when the fluid does not satisfy the liquid threshold: causing the pump to remain deactivated; and activating at least one injector to increase a pressure of the fluid and drive the fluid through a secondary inlet of the pump.

The method of any preceding clause, further including activating a heater upstream of the at least one injector when a temperature of the fluid does not satisfy a temperature threshold.

The method of any preceding clause, further including activating a heater upstream of the at least one injector when the pressure of the fluid does not satisfy a pressure threshold.

The method of any preceding clause, further including determining at least one of heating or pressurization parameters to convert liquid to a supercritical or gaseous state.

The method any preceding clause, further including controlling an apportionment of the fluid from a primary output conduit, a primary input conduit, and an accumulator that is delivered to the at least one injector.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A system comprising:
  a pump including a primary inlet, a primary outlet, and a secondary inlet:
  a first conduit including a first end coupled to the pump at the primary inlet:
  a second conduit including a second end coupled to the pump at the primary outlet:
  at least one injector including a first inlet, a second inlet, and at least one outlet, the at least one injector to drive fluid that flows through the first inlet and the second inlet through the at least one outlet:
  a third conduit including a third end and a fourth end, the third end coupled to the first conduit upstream of the primary inlet, the fourth end coupled to the at least one injector at the first inlet to deliver the fluid:
a fourth conduit including a fifth end and a sixth end, the fifth end coupled to the second conduit downstream of the primary outlet, the sixth end coupled to the at least one injector at the second inlet to deliver the fluid; and
a fifth conduit including a seventh end and an eighth end, the seventh end coupled to the at least one injector at the at least one outlet to receive the fluid, the eighth end coupled to the pump at the secondary inlet to deliver the fluid.

2. The system of claim 1, further including an accumulator coupled to the third conduit, the accumulator containing a liquid state of the fluid.

3. The system of claim 2, further including a heater coupled to a portion of the third conduit between the accumulator and the second end of the third conduit.

4. The system of claim 3, further including programmable circuitry to:
cause the heater to generate heat when a pressure of the fluid in the system does not satisfy a pressure threshold; and
cause the heater to remain inactive when the pressure of the fluid in the system satisfies the pressure threshold.

5. The system of claim 1, wherein the secondary inlet is a first secondary inlet, wherein the pump includes a second secondary inlet, further including:
a nozzle operatively coupled to the at least one injector at the at least one outlet to receive the fluid, the nozzle including a first outlet and a second outlet separate from the first outlet, wherein the seventh end of the fifth conduit is operatively coupled to the nozzle at the first outlet to receive the fluid; and
a sixth conduit including a ninth end and a tenth end, the ninth end operatively coupled to the nozzle at the second outlet to receive the fluid, the tenth end operatively coupled to the pump at the second secondary inlet to deliver the fluid.

6. The system of claim 1, wherein the secondary inlet is a first secondary inlet, wherein the pump includes a second secondary inlet, wherein the fluid enters the pump through the first secondary inlet and not the second secondary inlet during a first operation, and wherein the fluid enters the pump through the second secondary inlet and not the first secondary inlet during a second operation.

7. The system of claim 6, wherein the pump includes a motor, and wherein the second secondary inlet is positioned closer than the first secondary inlet to the motor.

8. The system of claim 7, wherein the second operation occurs after the first operation.

9. The system of claim 6, wherein the pump includes a foil bearing, wherein the first secondary inlet is positioned closer than the second secondary inlet to the foil bearing.

10. The system of claim 1, wherein the secondary inlet is a first secondary inlet, wherein the pump includes a second secondary inlet, further including:
a sixth conduit including a ninth end and a tenth end, the ninth end operatively coupled to the fifth conduit, the tenth end operatively coupled to the pump to deliver the fluid to the second secondary inlet; and
a valve operatively coupled to the fifth conduit or the sixth conduit, the valve movable between a first position and a second position, wherein the fluid is to flow through the fifth conduit to the first secondary inlet when the valve is in the first position, and wherein the fluid is to flow through the sixth conduit to the second secondary inlet when the valve is in the second position.

11. The system of claim 10, further including processor circuitry to:
cause the valve to be in the first position when a pressure of the fluid does not satisfy a pressure threshold or a temperature of the fluid does not satisfy a temperature threshold; and
cause the valve to be in the second position when the pressure of the fluid satisfies the pressure threshold or the temperature of the fluid satisfies the temperature threshold.

12. The system of claim 1, further including programmable circuitry to:
when the fluid in the system does not satisfy a liquid threshold, cause the pump to remain inactive; and
when the fluid in the system satisfies the liquid threshold, cause power to be delivered to a motor of the pump.

13. The system of claim 1, wherein the fifth conduit includes a mixture of the fluid from the third conduit and from the fourth conduit, wherein the mixture includes a first percentage of the fluid from the third conduit when the fluid in the system does not satisfy a liquid threshold, and wherein the mixture includes a second percentage of the fluid from the third conduit when the fluid in the system satisfies the liquid threshold, the first percentage greater than the second percentage.

14. A system comprising:
a pump including a motor, a foil bearing, a primary inlet, a primary outlet, and a secondary inlet;
a conduit including a first end and a second end, the first end coupled to the pump at the secondary inlet to deliver fluid, and
a thermal management system including:
an accumulator to house the fluid in a liquid state; and
an injector including an inlet and an outlet, the inlet to receive the fluid from the accumulator, the conduit coupled to the injector at the outlet to receive the fluid.

15. The system of claim 14, wherein the thermal management system includes a heater downstream of the accumulator and upstream of the injector.

16. The system of claim 15, further including programmable circuitry to:
control the heater to generate heat when a pressure of the fluid in the pump does not satisfy a pressure threshold or a temperature of the fluid in the pump does not satisfy a temperature threshold; and
control the heater to remain inactive when the pressure of the fluid in the pump satisfies the pressure threshold or the temperature of the fluid in the pump satisfies the temperature threshold.

17. The system of claim 14, wherein the conduit is a first conduit and the secondary inlet is a first secondary inlet, wherein the pump includes a second secondary inlet, further including:
a second conduit including a third end and a fourth end, the third end coupled to the first conduit, the fourth end coupled to the pump at the second secondary inlet; and
a valve operatively coupled to the first conduit or the second conduit, wherein the valve is movable between a first position and a second position, the first position of the valve to cause the fluid to flow through the first secondary inlet, the second position of the valve to cause the fluid to flow through the second secondary inlet.

18. The system of claim 17, wherein the first secondary inlet channels the fluid closer than the second secondary inlet to the motor, further including programmable circuitry to:
   cause the valve to be in the second position when a pressure of the fluid in the pump does not satisfy a pressure threshold or a temperature of the fluid in the pump does not satisfy a temperature threshold; and
   cause the valve to be in the first position when the pressure of the fluid in the pump satisfies the pressure threshold or the temperature of the fluid in the pump satisfies the temperature threshold.

19. A system comprising:
   means for pumping including:
      means for driving a fluid;
      means for bearing the means for driving; and
      means for containing the means for bearing, the fluid in a first state of the fluid in the means for containing during first operations, the fluid in a second state of the fluid in the means for containing during second operations after the first operations;
   first means for conveying the fluid;
   second means for conveying the fluid; and
   means for injecting the fluid from the first means for conveying and the second means for conveying into the means for containing.

20. The system of claim 19, further including means for accumulating the fluid in the first state of the fluid, the means for injecting to receive a portion of the fluid from the means for accumulating.

* * * * *